(12) United States Patent
O'Hare et al.

(10) Patent No.: US 12,343,860 B2
(45) Date of Patent: Jul. 1, 2025

(54) AUTOMATED WORK-HOLDING FOR PRECISE FASTENING OF LIGHT PARTS DURING AUTOMATED TRANSFER

(71) Applicant: Hexagon Metrology, Inc., North Kingstown, RI (US)

(72) Inventors: Jonathan J. O'Hare, East Greenwich, RI (US); Jonathan Dove, Woodstock, IL (US)

(73) Assignee: Hexagon Metrology, Inc., North Kingstown, RI (US)

( * ) Notice: Subject to any disclaimer, the term of this patent is extended or adjusted under 35 U.S.C. 154(b) by 476 days.

(21) Appl. No.: 17/949,940

(22) Filed: Sep. 21, 2022

(65) Prior Publication Data
US 2023/0158684 A1 May 25, 2023

Related U.S. Application Data

(63) Continuation-in-part of application No. 17/535,104, filed on Nov. 24, 2021, now Pat. No. 12,066,808.

(51) Int. Cl.
  *B25J 13/06* (2006.01)
  *B23Q 1/25* (2006.01)
  (Continued)

(52) U.S. Cl.
  CPC .............. *B25J 13/06* (2013.01); *B23Q 1/25* (2013.01); *B23Q 3/06* (2013.01); *B23Q 7/04* (2013.01);
  (Continued)

(58) Field of Classification Search
  CPC ... B23Q 1/25; B23Q 3/06; B23Q 7/04; G01B 21/04; G01B 5/008; G05B 19/401; B25J 13/06
  (Continued)

(56) References Cited

U.S. PATENT DOCUMENTS

| 6,463,835 B1 | 10/2002 | Segawa et al. |
| 6,668,466 B1 | 12/2003 | Bieg et al. |

(Continued)

FOREIGN PATENT DOCUMENTS

| CN | 203437971 U | * | 2/2014 |
| CN | 212763012 U | * | 3/2021 |

(Continued)

OTHER PUBLICATIONS

International Search Report and Written Opinion for International Application No. PCT/US2022/050671, mailed Feb. 24, 2023 (29 pages).

(Continued)

*Primary Examiner* — Ronald D Hartman, Jr.
(74) *Attorney, Agent, or Firm* — Nutter McClennen & Fish LLP

(57) ABSTRACT

Illustrative embodiments improve holding of a workpiece in an industrial process by placing the workpiece on or in a workpiece interface of a workholder and, prior to securing the workpiece on or in the workholder, vibrating the workpiece interface to settle the workpiece onto or into the workpiece interface. The act of vibrating the workpiece interface is separate and distinct from an act of securing the workpiece to the workpiece interface, and the vibration from the act of vibrating the workpiece interface is separate and distinct from vibration that may occur incidental to the act of securing the workpiece to the workpiece interface. Some embodiments of a workholder include a vibration actuator distinct from a workpiece interface actuator that opens and closes the workpiece interface. Some embodiments of workpiece interface include a set of one or more tapered guides to guide a workpiece onto the workpiece interface.

20 Claims, 15 Drawing Sheets

(51) Int. Cl.
  *B23Q 3/06* (2006.01)
  *B23Q 7/04* (2006.01)
  *G01B 5/008* (2006.01)
  *G01B 21/04* (2006.01)
  *G05B 19/401* (2006.01)

(52) U.S. Cl.
  CPC ............ *G01B 5/008* (2013.01); *G01B 21/04* (2013.01); *G05B 19/401* (2013.01)

(58) Field of Classification Search
  USPC .......................................................... 700/264
  See application file for complete search history.

(56) References Cited

U.S. PATENT DOCUMENTS

| | | | |
|---|---|---|---|
| 8,255,184 B2 | 8/2012 | Chang et al. | |
| 8,516,710 B2 | 8/2013 | Jordil | |
| 8,825,427 B2 | 9/2014 | Kunzmann et al. | |
| 9,683,828 B2 | 6/2017 | Pettersson et al. | |
| 2004/0039484 A1* | 2/2004 | Watanabe | G05B 19/41835 700/245 |
| 2005/0150123 A1 | 7/2005 | Eaton | |
| 2008/0009972 A1* | 1/2008 | Nihei | B25J 9/1669 700/245 |
| 2013/0197852 A1* | 8/2013 | Grau | G01B 5/008 702/123 |
| 2014/0222372 A1 | 8/2014 | Sprenger | |
| 2017/0090742 A1 | 3/2017 | Ade et al. | |
| 2017/0363403 A1 | 12/2017 | Jonas | |
| 2018/0339456 A1* | 11/2018 | Czinger | B29C 64/379 |
| 2019/0193268 A1 | 6/2019 | Tsou | |
| 2020/0113373 A1* | 4/2020 | Knuepfel | B25J 9/023 |
| 2020/0233392 A1* | 7/2020 | Jonas | G01B 21/04 |
| 2020/0356218 A1* | 11/2020 | O'Hare | G05B 19/4187 |
| 2021/0387301 A1* | 12/2021 | O'Hare | B25J 9/1697 |
| 2022/0412721 A1 | 12/2022 | Miyaki et al. | |
| 2023/0161317 A1 | 5/2023 | O'Hare et al. | |

FOREIGN PATENT DOCUMENTS

| | | | |
|---|---|---|---|
| JP | 2002036165 A | * | 2/2002 |
| JP | 2016203354 A | * | 12/2016 |
| KR | 20180107391 A | | 10/2018 |
| WO | 89/01850 A1 | | 3/1989 |
| WO | 9735164 A1 | | 9/1997 |
| WO | 2020128441 A1 | | 6/2020 |
| WO | 2023096884 A1 | | 6/2023 |

OTHER PUBLICATIONS

International Search Report and Written Opinion for International Application No. PCT/US2023/035699 mailed Feb. 8, 2024 (30 pages).

International Search Report and Written Opinion for International Application No. PCT/US2024/014838 mailed Jun. 11, 2024 (15 pages).

International Preliminary Report on Patentability for International Application No. PCT/US2022/050671, mailed Jun. 6, 2024 (11 pages).

International Search Report and Written Opinion for International Application No. PCT/US2023/028611, mailed Oct. 27, 2023 (28 pages).

* cited by examiner

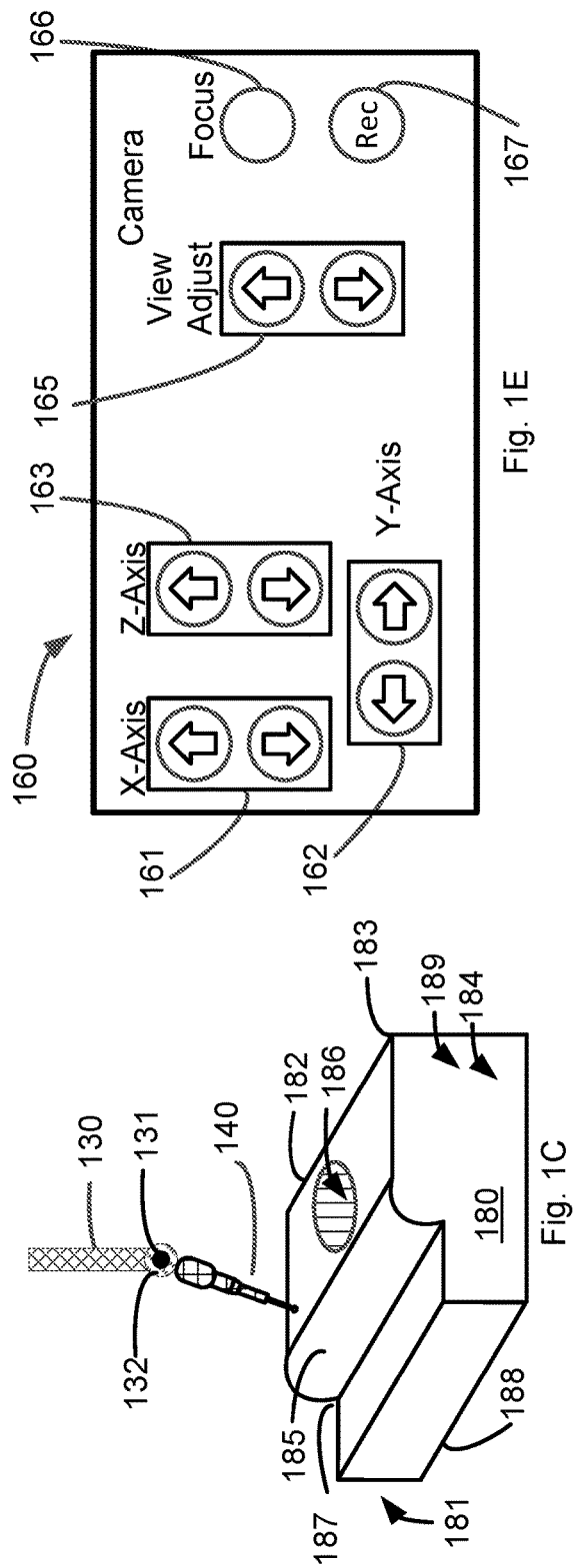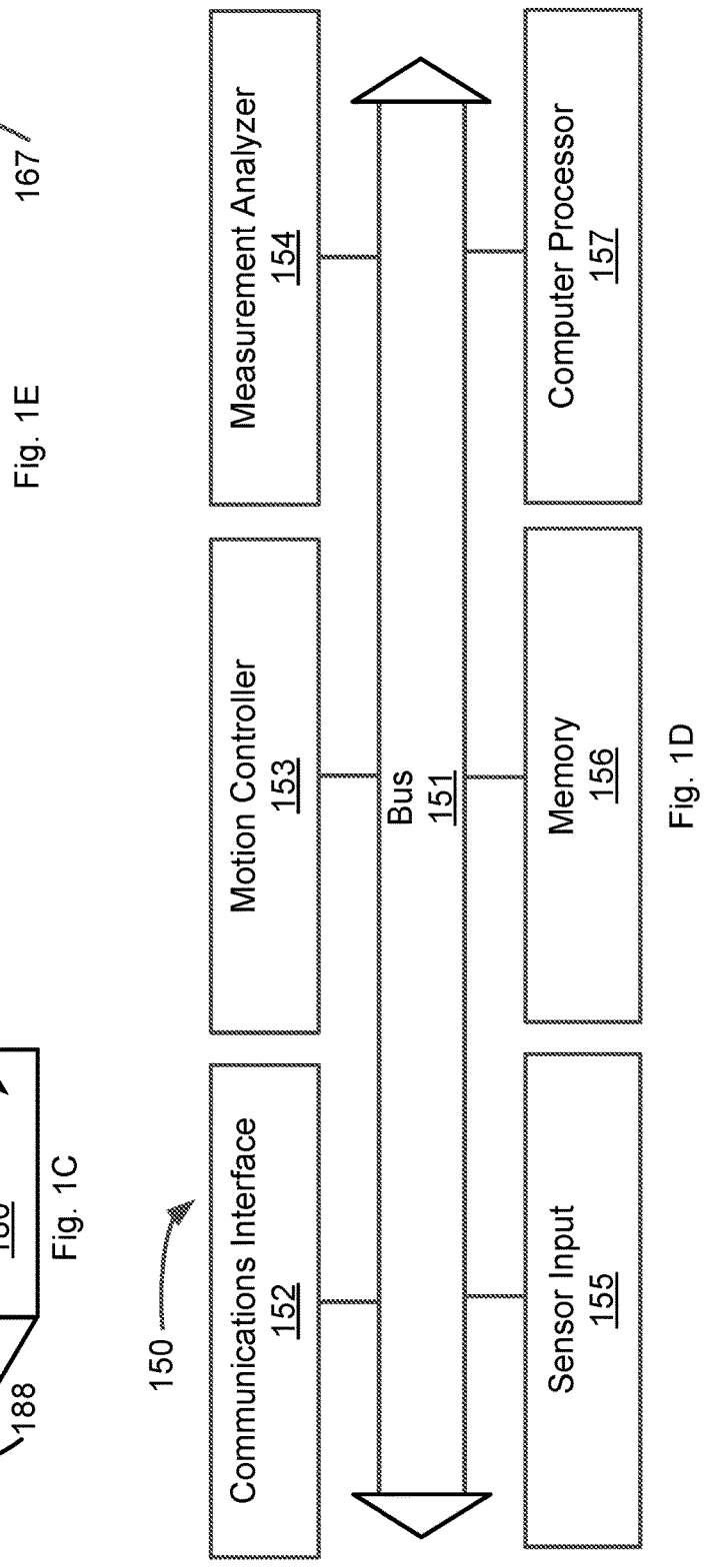

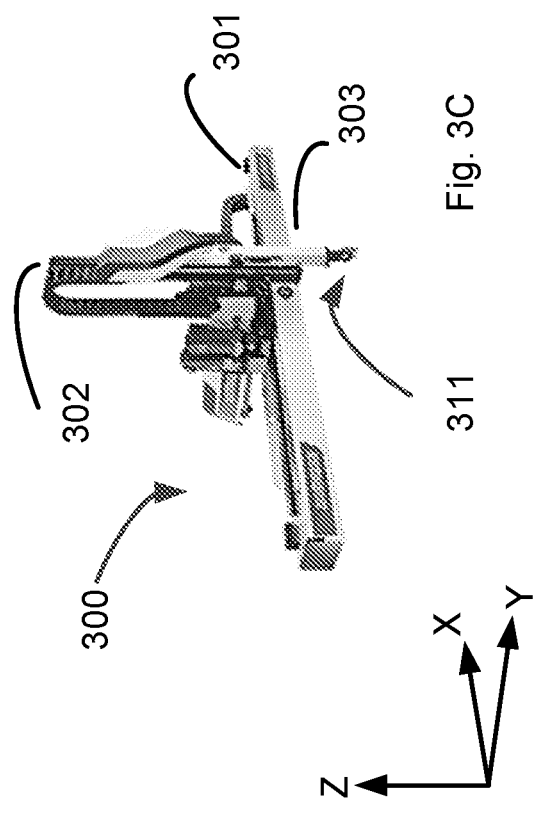
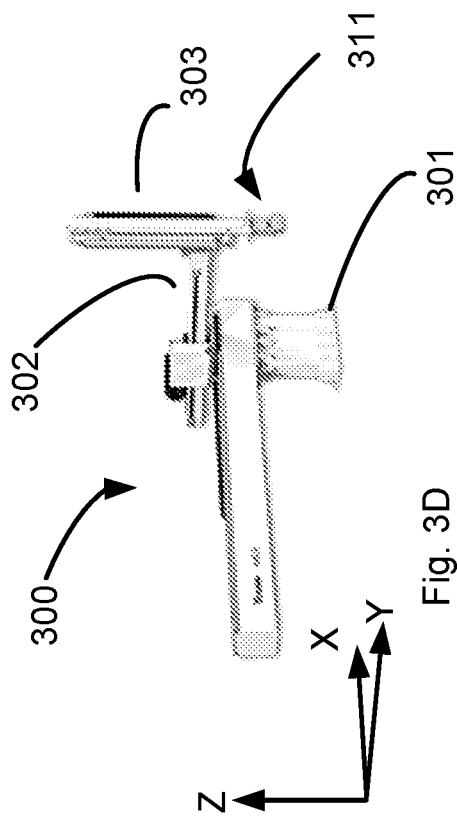
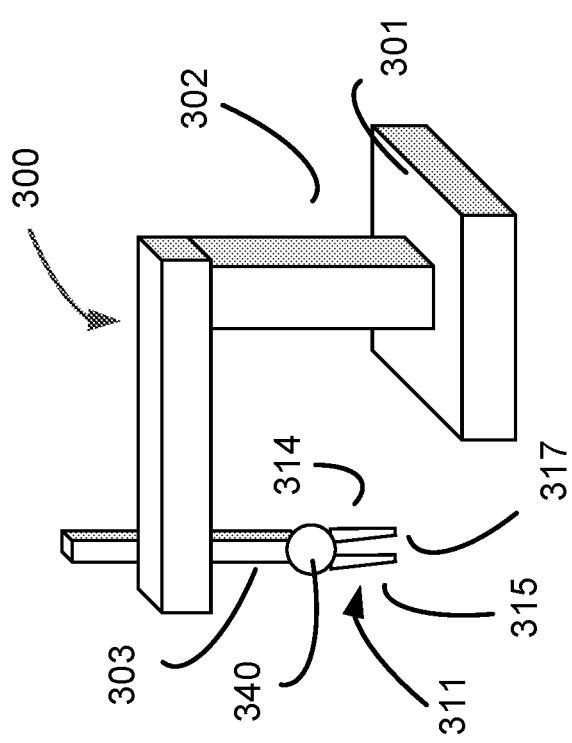
Fig. 3C
Fig. 3D
Fig. 3B

AUTOMATED WORK-HOLDING FOR PRECISE FASTENING OF LIGHT PARTS DURING AUTOMATED TRANSFER

RELATED APPLICATIONS

This application is a continuation-in-part of U.S. non-provisional patent application Ser. No. 17/535,104, filed Nov. 24, 2021 and titled "Parametric and Modal Workholding Method for Automated Inspection" and naming Jonathan J. O'Hare and Jonathan Dove as inventors The disclosures of all of the foregoing are incorporated herein by reference, in their entirety.

TECHNICAL FIELD

Embodiments generally relate to production processes, more particularly, embodiments relate to inspection operations.

BACKGROUND ART

One of the most rapidly growing areas in manufacturing is automation. Companies today need to be globally competitive and thus must be able to justify highly skilled labor through the efficiency of their operation. To this end, collaborative robots (COBOTs) as well as other automated machinery, must be effectively integrated into each production process and work as independently of human intervention as possible.

One such production process in many manufacturing operations is the inspection or measurement process. Coordinate measuring machines (CMMs) have long been used to assist in providing critical measurement data to provide the necessary feedback to control all of the other processes responsible for producing the product. Conventional CMMs do not collaborate with other equipment or share the information they acquire to enable process level decisions to be made on their own. CMMs still often rely on human operators to make decisions to prepare parts for inspection as well as analyze the results for corrective action.

Work-holding systems and methods for the inspection process often include hardware which is referred to as fixtures for specific types of manufactured parts. Any manufactured part that has work performed on it as part of a process may also more generally be referred to as a workpiece. It is important however to make the distinction between a work-holding method and a fixture, as the means by which to hold a workpiece for some operation to be performed on it may not include a fixture at all. In many cases, work-holding is accomplished through the use of a variety of common hardware components, such as screw clamps, vises, spring levers, mounting plates, riser blocks, clay, glue, etc. The reason for this is that many inspection processes implement automated inspection systems which are intended to inspect a variety of workpieces, whereas in the case of other manufacturing operations, they are typically setup for a dedicated operation on a specific workpiece. It is therefore a common practice in most inspection processes to have a flexible means by which to hold different workpieces. One solution for this is to have dedicated fixtures designed for each workpiece, however this can be also extremely expensive since they must also be designed specifically for measurement sensor accessibility. Another common solution in industry is to have assortment of work-holding hardware in the form of modular fixture kits so that custom fixtures can be built on an as-need basis. The problem with using modular fixture kits as a work-holding method is that it may be inconsistently rebuilt over time causing reliability and measurement reproducibility problems. This is due to the fact that high accuracy measurements are often subject to deflection in the work-piece due to applied forces during work-holding. On the other extreme, a workpiece may not be held tightly enough so that there is unwanted or 'lost' motion during motion thereby causing false measurements. Lastly, the problem with both of aforementioned industry work-holding solutions is that they must be frequently switched out on the same inspection system that is being used for a variety of workpieces. The frequent changing of fixtures or work-holding methods between jobs on the same machine becomes an operational efficiency problem.

SUMMARY OF VARIOUS EMBODIMENTS

In accordance with one embodiment, a method of operating a workholder having a workpiece interface configured to controllably clamp a workpiece, includes:
  placing the workpiece into the workpiece interface, the workpiece interface being open to receive the workpiece;
  prior to closing the workpiece interface, and separate from closing the workpiece interface, vibrating the workpiece interface to settle the workpiece into the workpiece interface; and subsequent to vibrating the workpiece interface
  closing the workpiece interface to secure the workpiece to the workholder.

In some embodiments, the method further includes delivering, by a robot, the workpiece proximate to the workpiece interface, and pausing for a pre-established amount of time prior to placing the workpiece into the workpiece interface.

In some embodiments, the workholder includes a workholder actuator operably coupled to the workpiece interface to controllably close the workpiece interface, and vibrating the workpiece interface includes operating the workholder actuator without closing the workpiece interface.

In some embodiments, the workholder includes a workholder actuator operably coupled to the workpiece interface to controllably open the workpiece interface with an opening motion, and to controllably close the workpiece interface with a closing motion, and vibrating the workpiece interface to settle the workpiece into the workpiece interface includes alternating the workholder actuator between an opening motion and a closing motion.

In some embodiments, the workholder includes a vibration actuator in addition to the workholder actuator, and
  vibrating the workpiece interface includes operating the vibration actuator without closing the workpiece interface; and
  closing the workpiece interface includes operating workholder actuator separately from operating the vibration actuator.

In some embodiments, the workpiece interface includes a substrate defining a substrate plane and a set of guides, each guide of the set of guides having a surface extending away from the substrate plane, and disposed and configured to guide the workpiece onto the substrate in response to vibrating the workpiece interface. In some such embodiments, the set of guides includes a tapered post, the tapered post having a slide surface angled to intersect the substrate plane at an intersection such that the slide surface and the substrate plane form an obtuse angle at said intersection, the slide surface disposed and configured to guide the workpiece onto the substrate in response to vibrating the workpiece interface. In some embodiments, the workpiece defines a workpiece aperture having an edge, and the tapered post is configured to pass through the workpiece aperture and the slide surface is disposed and configured to engage the edge to guide the workpiece onto the substrate in response to vibrating the workpiece interface. In some embodiments, the set of guides includes a corner guide having two surfaces, the two surfaces extending away from the substrate plane, the two surfaces disposed at an angle to one another, so as to guide the workpiece onto the substrate in two corresponding directions in response to vibrating the workpiece interface. In some embodiments, the set of guides includes a pair of corner guides, each corner guide of the pair of corner guides having two tapered surfaces, the two tapered surfaces disposed at an angle to one another, so as to guide the workpiece onto the substrate in two corresponding directions in response to vibrating the workpiece interface, wherein the pair of corner guides cooperate, in response to vibrating the workpiece interface, to automatically center the workpiece in at least one axis on the substrate plane.

In some embodiments, the workpiece interface includes a substrate defining a substrate plane, and having a set of end stops, each end stop of the set of end stops having a set of end stop faces extending in a direction away from the substrate plane, each end stop of the set of end stops disposed and configured to constrain the workpiece while the workpiece is clamped by the workpiece interface.

An embodiment of a workholder to receive and securely hold a workpiece includes a base;
  a workpiece interface coupled to the base, the workpiece interface configured to open into an open configuration to receive a workpiece, and configured to close into a closed position to secure the workpiece; and
  a set of actuators, at least actuator of the set of actuators operably coupled to the workpiece interface to controllably close the workpiece interface; and
  at least actuator of the set of actuators operably coupled to the workholder to controllably vibrate the workpiece interface independent of closing the workpiece interface.

In some embodiments, the set of actuators includes a workholder actuator, said workholder actuator is operably coupled to the workpiece interface and configured:
  to controllably open the workpiece interface with an opening motion, and to controllably close the workpiece interface with a closing motion; and, separately from closing the workpiece interface,
  to controllably vibrate the workpiece interface by alternately causing an opening motion and a closing motion without clamping the workpiece into the workpiece interface.

In some embodiments, the set of actuators includes:
  a workholder actuator operably coupled to the workpiece interface to controllably close the workpiece interface; and
  a vibration actuator operably coupled to the workholder to controllably vibrate the workpiece interface independent of closing the workpiece interface. the workholder actuator is a distinct actuator from the vibration actuator and the workholder actuator is controllably operable to close the workpiece interface independently of control of the vibration actuator to vibrate the workpiece interface.

In some embodiments, the workpiece interface includes:
  a substrate defining a substrate plane; and a set of tapered guides, each tapered guide of the set of tapered guides having a surface extending away from the substrate plane, and disposed and configured to guide the workpiece onto the substrate in response to vibrating the workpiece interface.

In some embodiments of the workholder, the set of tapered guides includes a tapered post, the tapered post having an slide surface, the slide surface disposed relative to the substrate plane such that the slides surface intersects the substrate plane such that the slide surface and substrate plane form an obtuse angle, the slide surface disposed and configured to guide the workpiece onto the substrate in response to vibrating the workpiece interface.

In some embodiments of the workholder, the workpiece defines a workpiece aperture having an edge, and the tapered post is configured to pass through the workpiece aperture and the slide surface is disposed and configured to engage the edge to guide the workpiece onto the substrate in response to vibrating the workpiece interface.

In some embodiments, a workholder to receive and securely hold a workpiece includes:
  means for receiving a workpiece and controllably closing to clamp the workpiece, said means being workpiece interface means;
  means for controllably closing the workpiece interface means; and
  means for controllably vibrating the workpiece interface means to settle the workpiece into the workpiece interface means prior to closing to clamp the workpiece.

In some embodiments, the means for controllably closing the workpiece interface means is distinct from, and is controllable independently of, the means for controllably vibrating the workpiece interface means.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

FIG. 1C schematically illustrates an embodiment of a workpiece;

FIG. 1D an embodiment of a control system for a coordinate measuring machine;

FIG. 1E schematically illustrates an embodiment of a manual user interface for a coordinate measuring machine;

FIG. 3B schematically illustrates an embodiment of a workpiece placement robot;

FIG. 3C schematically illustrates an embodiment of a workpiece placement robot;

FIG. 3D schematically illustrates an embodiment of a workpiece placement robot;

DESCRIPTION OF ILLUSTRATIVE EMBODIMENTS

Figure 1A:
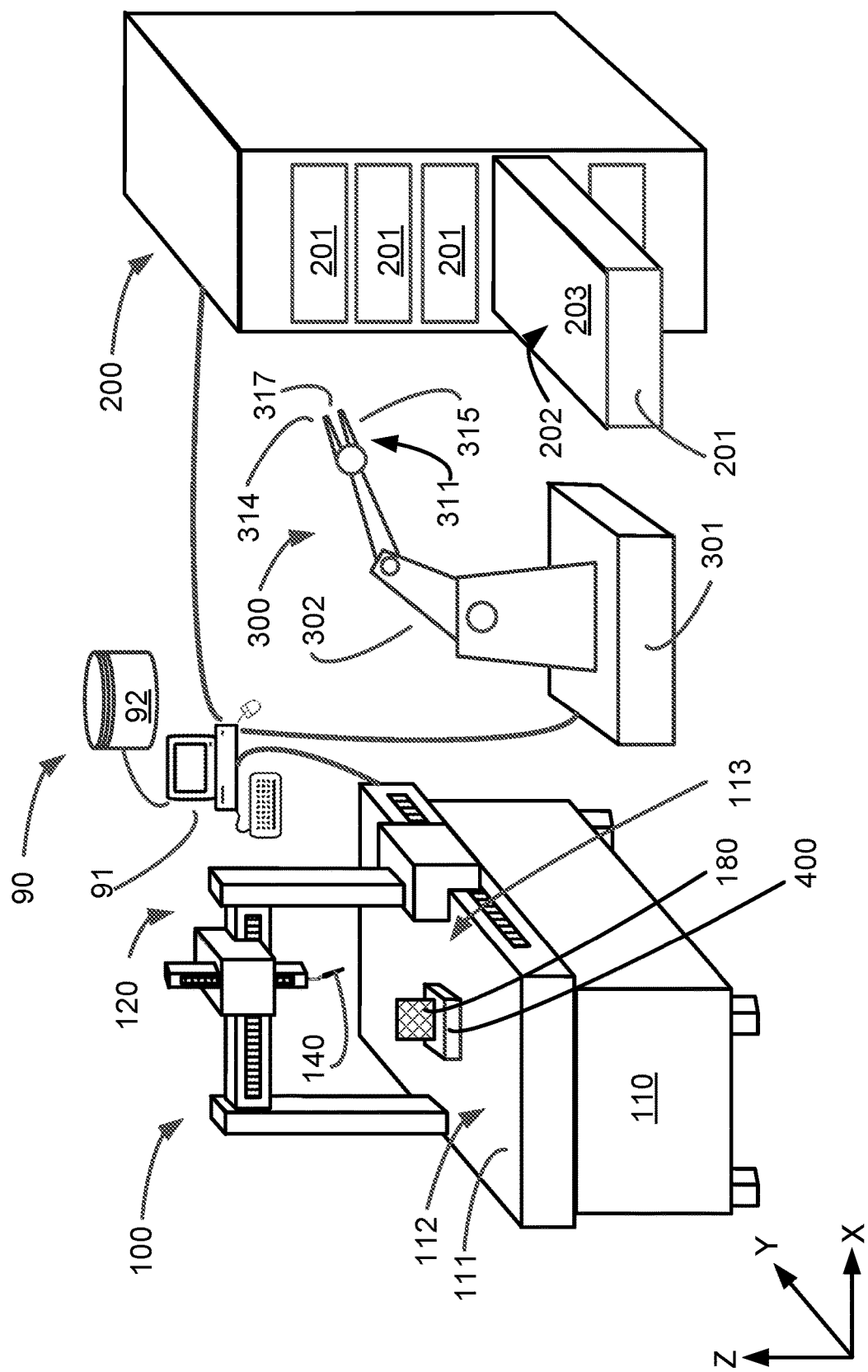
FIG. 1A schematically illustrates a coordinate measuring machine, a robot and a storage apparatus for storing workpieces.

Illustrative embodiments improve holding of a workpiece in an industrial process (such as measuring the workpiece with a coordinate measuring machine, or machining the workpiece by a machine tool) by placing the workpiece on or in a workpiece interface of a workholder and, prior to securing the workpiece on or in the workholder, vibrating the workpiece interface to settle the workpiece onto or into the workpiece interface. The act of vibrating the workpiece interface is separate and distinct from an act of securing the workpiece to the workpiece interface, and the vibration from the act of vibrating the workpiece interface is separate and distinct from vibration that may occur incidental to the act of securing the workpiece to the workpiece interface. Some embodiments of a workholder include a vibration actuator distinct from a workpiece interface actuator that opens and closes the workpiece interface. Some embodiments of workpiece interface include a set of one or more tapered guides to guide a workpiece onto the workpiece interface.

Definitions: As used in this description and the accompanying claims, the following terms shall have the meanings indicated, unless the context otherwise requires.

An "actuator" is an apparatus coupled to a workholder and configured to move controllably in response to a controller. Such controllable motion may include a vibration to cause the workholder to open and/or close, for example to clamp and/or release a workpiece. An actuator may be, without limitation, an electric motor, a pneumatic apparatus, or a hydraulic apparatus, to name but a few examples.

A "closing motion," in reference to a motion of a workpiece interface, is a motion in a direction so as to close the workpiece interface. A closing motion, if maintained, will ultimately cause the workpiece interface to clamp a workpiece to the workholder of which the workpiece interface is a part. However, a closing motion may be stopped before causing the workpiece interface to clamp a workpiece to the workholder.

The term "end effector" (or simply "effector") is a general term for an apparatus disposed on or integral to a robot arm, which apparatus is configured to get and hold an object to enable the robot arm to pick-up an object at one location, move and deliver the object to a different location. For example, one embodiment of an end effector is a mechanism used to grasp and hold an object to or by a robotic arm, typically (but not necessarily) disposed at the end of the robotic arm. An illustrative embodiment of such a mechanism is a gripper with two or more fingers.

A "family" of workpieces means a set of workpieces, wherein each workpiece of said set is associated with the same (or an identical) workpiece delivery ruleset for customizing the configuration and/or the operation of at least one instruments of the set of instruments of a workpiece inspection system to move a workpiece and deliver the workpiece to a workholder. The workpieces in said set of workpieces may identical to one another, or may be non-identical to one another, as long as the customization or configuration of said set of instruments of a workpiece inspection system is performed pursuant to the same (or an identical) workpiece delivery ruleset.

This allows a robot and/or workholder to be configured pursuant to one workpiece delivery ruleset, even when the workpieces that belong to the family are non-identical to one another. In other words, not every non-identical workpiece requires a corresponding non-identical ruleset.

The term "non-identical" with regard to a plurality of workpieces means that the workpieces would not be identical to one another even if all such workpieces are devoid of manufacturing defects or deviations. For example, a fan blade and a ball bearing would be non-identical to one another because they would not be identical even if each was devoid of manufacturing defects or deviations. A plurality of workpieces are considered to be identical to one another if they would be physically identical in the case that each workpiece exactly matched the same design specification, free of manufacturing defects. For example, two fan blades based on the same design specification may be considered to be identical to one another when they would be identical to one another but for manufacturing defects or deviations.

An "opening motion," in reference to a motion of a workpiece interface, is a motion in a direction so as to open the workpiece interface. An opening motion may be stopped before the workpiece interface is open to its maximum degree, and/or before the workpiece interface is open to a degree that a workpiece can be removed from the workpiece interface.

A "set" includes at least one member. For example, and without limiting the generality of the definition, a set of workpieces includes at least one workpiece.

The term "workpiece" means an object to be operated upon by an industrial machine. For example, a workpiece may be inspected by a workpiece inspection instrument, such as a coordinate measuring machine, and/or may be operated upon by a lathe or computer numerically controlled cutting machine, to name but a few examples.

A "workholder" is an apparatus that couples to a workpiece to hold the workpiece stationary, for example when the workpiece is on a table of a coordinate measurement machine. The term workholder may include a clamp; a vise; pneumatic vice; a vacuum suction device; a chuck; and a three-jaw chuck, to name but a few examples.

To "measure" an object means to determine a quantitative physical dimension of a portion of an object from a plurality of points on the object. A quantitative physical dimension may include, for example and without limitation, a height, length and/or width of the object or a portion of the object. Measuring an object is not the same as merely detecting the presence of an object, and is not the same as merely locating an object, or determining the orientation of an object.

To "detect" an object means to determine the presence of an object. It is possible to detect an object without measuring the object, or a portion of the object, in that detection does not require determining a quantitative physical dimension of a portion of an object.

To "locate" an object means to determine the location of an object with reference to a known point in space, or within a coordinate system. It is possible to locate an object without measuring the object, or a portion of the object, in that locating an object does not require determining a quantitative physical dimension of a portion of an object.

Environment

FIG. 1A schematically illustrates a working environment for various embodiments. As shown the environment includes several instruments which may be referred to collectively as an embodiment of a workpiece inspection system 90, including in this embodiment a coordinate measuring machine 100, and a storage apparatus 200, and a robot 300. Some embodiments also include a workholder 400, as described below.

Coordinate Measuring Machine 100

As known by those in the art, a coordinate measuring machine (or "CMM") 100 is a system configured to measure one or more features of a workpiece. Coordinate measuring machines are represented in FIG. 1A by coordinate measuring machine 100.

FIGS. 1B-1E schematically illustrate a coordinate measurement machine 100 that may be configured in accordance with illustrative embodiments.

As known by those in the art, a CMM is a system configured to measure one or more features of a workpiece 180. An illustrative embodiment of a workpiece 180 is schematically illustrated in FIG. 1C. Typically, a workpiece 180 has a specified shape with specified dimensions, which may be referred-to collectively as the "geometry" 181 of the workpiece 180. As an example, a workpiece 180 may have an edge 182, and a corner 183. A workpiece 180 may also have surfaces, such as a flat surface 184, and a curved surface 185. A meeting of two surfaces may create an inside angle 187. Moreover, each surface may have physical characteristic such as waviness 188 and/or surface finish 189, as known in the art. A workpiece 180 may also have a cavity 186, which may also be an aperture through the workpiece 180. As known in the art, a cavity 186 may have dimensions such as width and depth, which may in turn define an aspect ratio of the cavity 186.

CMM Base

In the illustrative embodiment of FIG. 1A, the CMM 100 includes a base 110 having a table 111. The table 111 of the CMM 100 defines an X-Y plane 112 that typically is parallel to the plane of the floor 101, and a Z-axis normal to the X-Y plane, and a corresponding X-Z plane and Y-Z plane. The table 111 also defines a boundary of a measuring space 113 above the table 111. In some embodiments, the CMM 100 includes a probe rack 115 configured to hold one or more measuring sensors 140. A moveable part of the CMM 100 may move to the probe rack 115 and place a measuring sensor 140 into the probe rack 115, and/or remove another measuring sensor 140 from the probe rack 115.

Moveable Parts

The CMM 100 also has movable features (collectively, 120) arranged to move and orient a measuring sensor 140 (and in some embodiments, a plurality of such devices) relative to the workpiece 180. As described below, movable features of the CMM 100 are configured to move and orient the measuring sensor 140, relative to the workpiece 180, in one dimension (X-axis; Y-axis; or Z-axis), two dimensions (X-Y plane; X-Z plane; or X-Z plane), or three dimensions (a volume defined by the X-axis, Y-axis, and Z-axis). Accordingly, the CMM 100 is configured to measure the location of one or more features of the workpiece 180.

Figure 1B:
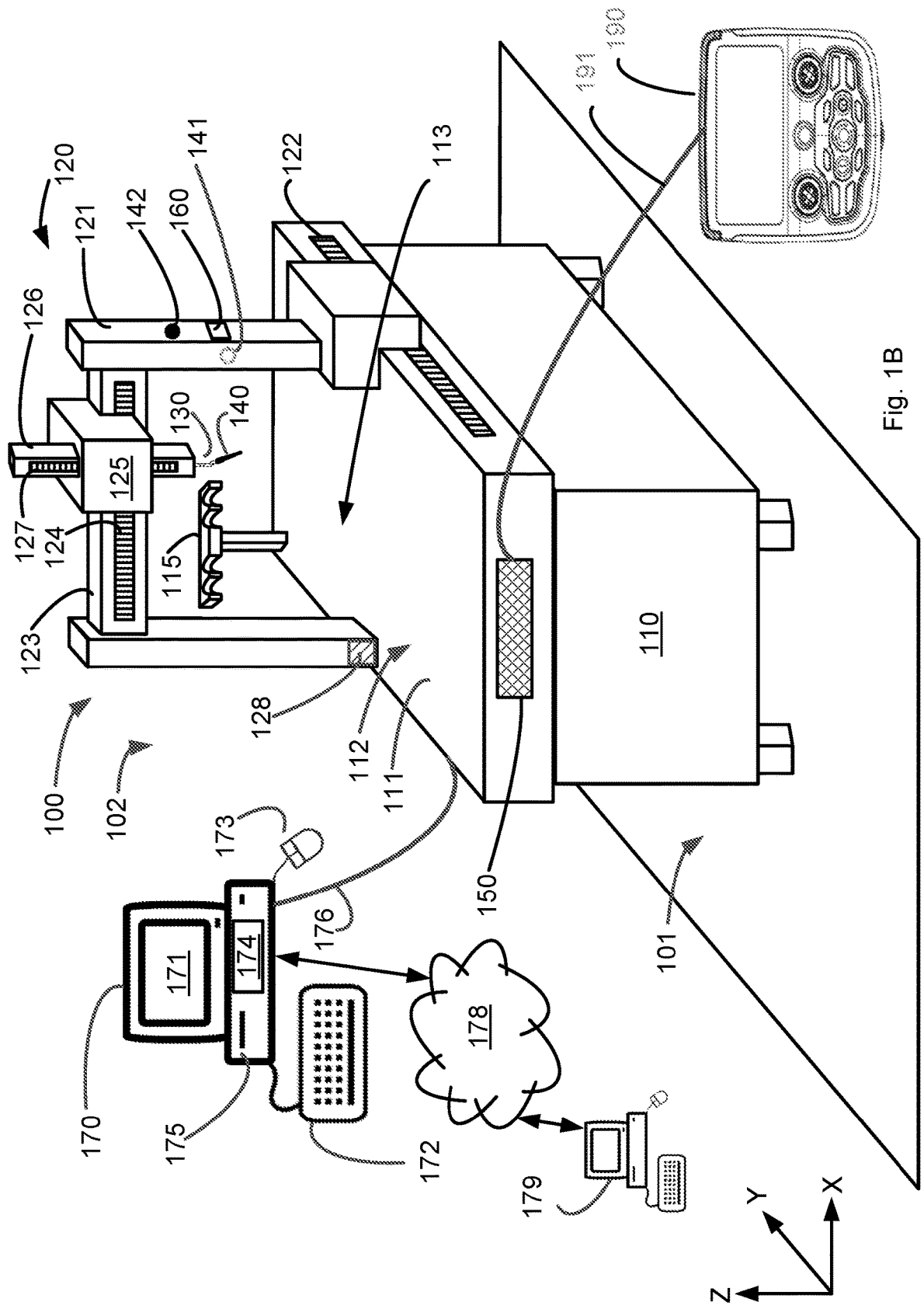
FIG. 1B schematically illustrates an embodiment of a coordinate measuring machine.

The CMM 100 of FIG. 1B is known as a "bridge" CMM. Movable features 120 of the bridge CMM 100 include a bridge 123 movably coupled to the base 110 by legs 121. The bridge 123 and legs 121 are controllably movable relative to the base 110 along the Y-axis.

To facilitate motion of the legs relative to the base 110, the legs 121 may be coupled to the base 110 by one or bearings 128. As known in the art, a bearing may be a roller bearing or an air bearing, to name but a few examples.

The movable features also include a carriage 125 movably coupled to the bridge 123. The carriage is configured to controllably move in the X-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the Z-axis. The position in the Z-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a workpiece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The moveable joint 131 allows the orientation of the measuring sensor 140 to be controllably adjusted relative to the arm 130, to provide to the measuring sensor 140 additional degrees of freedom in the X-axis, Y-axis, and/or Z-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the X-Y plane. In such embodiments, the CMM 100 moves the workpiece 180 relative to the measuring sensor.

In other embodiments, which may be generally referred-to as "horizontal arm" CMMs, the bridge 123 is movably coupled to the base 110 to extend in the Z-axis, and to be controllably movable along the Y-axis. In such a CMM, the arm 130 is controllably extendable in the Z-axis, and controllably movable up and down the bridge 123 in the Z-axis.

In yet other embodiments, the arm 130 is articulated. One end of the arm 130 is fixed to the base 110, and a distal end of the arm 130 is movable relative to the base 110 in one, two or three dimensions relative to a workpiece 180 in the measuring space 113.

Sensors

In some embodiments, the measuring sensor 140 may be a tactile probe (configured to detect the location of a point on the workpiece 180 by contacting a probe tip to the workpiece 180, as known in the art), a non-contact probe (configured to detect the location of a point on the workpiece 180 without physically contacting the workpiece 180), such as a capacitive probe or an inductive probe as known in the art, or an optical probe (configured to optically detect the location of a point on the workpiece 180), to name but a few examples.

In some embodiments, the measuring sensor 140 is a vision sensor that "sees" the workpiece 180. Such a vision sensor may be a camera capable of focusing on the workpiece 180, or the measurement space 113, and configured to capture and record still images or video images. Such images, and/or pixels within such images, may be analyzed to locate the workpiece 180; determine the placement and/or orientation of the workpiece 180; identify the workpiece 180; and/or measure the workpiece 180, to name but a few examples.

Some embodiments of a CMM 100 may include one, or more than one, camera 141 configured such that the measurement space 113 is within the field of view of the camera 141. Such a camera 141 may be in addition to a measuring sensor 140. The camera 141 may be a digital camera configured to capture still images and/or video images of the measurement envelope 113, a workpiece 180 on the CMM 100, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the environment 102 around the CMM 100. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

In operation, the CMM 100 measures the workpiece 180 by moving the measuring sensor 140 relative to the workpiece 180 to measure the workpiece 180.

CMM Control System

Some embodiments of a CMM 100 include a control system 150 (or "controller" or "control logic") configured to control the CMM 100, and process data acquired by the CMM. FIG. 1D schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, digital memory (e.g., RAM or non-transient ROM) for storing data and/or computer code, including non-transient instructions for implementing some or all of the control system operations and methods. Alternately, or in addition, the computer processor 157 may be operably coupled to other digital memory, such as RAM or non-transient ROM, or a programmable non-transient memory circuit for storing such computer code and/or control data. Consequently, some or all of the functions of the controller 150 may be implemented in software configured to execute on the computer processor.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140 or camera 141. The sensor input 155 is configured to receive electronic signals from sensors, and in some embodiments to digitize such signals, using a digital to analog ("D/A") converter. The sensor input 155 is coupled to other modules of the control system 150 to provide to such other modules the (digitized) signals received from sensors.

The motion controller 153 is configured to cause motion of one or more of the movable features 120 of the CMM 100. For example, under control of the computer processor 157, the motion controller 153 may send electrical control signals to one or more motors within the CMM 100 to cause movable features of the CMM 100 to move a measuring sensor 140 to various points within the measuring space 113 and take measurements of the workpiece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a workpiece 180 to be measured; a specification for a calibration artifact; an error map; and non-transient instructions executable on the computer processor 157, to name but a few examples. Such instructions may include, among other things, instructions for controlling the moveable features of the CMM 100 for measuring a workpiece 180 and/or a calibration artifact; instructions for analyzing measurement data; and instructions for correcting measurement data (e.g., with an error map).

The measurement analyzer 154 is configured to process measurement data received from one or more sensors, such as measuring sensor 140. In some embodiments, the measurement analyzer 154 may revise the measurement data, for example by modifying the measurement data using an error map, and/or compare the measurement data to a specification, for example to assess deviation between a workpiece 180 and a specification for that workpiece 180. To that end, the measurement analyzer 154 may be a programmed digital signal processor integrated circuit, as known in the art.

Alternately, or in addition, some embodiments couple the CMM 100 with an external computer (or "host computer") 170. In a manner similar to the control system 150, the host computer 170 has a computer processor such as those described above, and non-transient computer memory 174, in communication with the processor of the CMM 100. The memory 174 is configured to hold non-transient computer instructions capable of being executed by the processor, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name but two examples.

Because their relative positions are determined by the action of the movable features of the CMM 100, the CMM 100 may be considered as having knowledge of the relative locations of the base 110, and the workpiece 180. More particularly, the computer processor 157 and/or computer 170 control and store information about the motions of the movable features. Alternately, or in addition, the movable features of some embodiments include sensors that sense the locations of the table 111 and/or measuring sensor 140, and report that data to the computer 170 or controller 150. The information about the motion and positions of the table and/or measuring sensor 140 of the CMM 100 may be recorded in terms of a one-dimensional (e.g., X, Y or Z), two-dimensional (e.g., X-Y; X-Z; Y-Z) or three-dimensional (X=Y–Z) coordinate system referenced to a point on the CMM 100.

Manual User Interface

Some CMMs also include a manual user interface 160. As shown in FIG. 1E, the manual user interface 160 may have controls (e.g., buttons; knobs, etc.) that allow a user to manually operate the CMM 100. Among other things, the interface 160 may include controls that enable the user to change the position of the measuring sensor 140 relative to the workpiece 180. For example, a user can move the measuring sensor 140 in the X-axis using controls 161, in the Y-axis using controls 162, and/or in the Z-axis using controls 163.

If the measuring sensor 140 is a vision sensor, or if the CMM 141 includes a camera 141, then the user can manually move the sensor 140, camera 141, or change field of view of the vision sensor and/or camera using controls 165. The user may also focus the vision sensor and/or camera 141 using control 166 (which may be a turnable knob in some embodiments) and capture and image, or control recording of video, using control 167.

As such, the movable features may respond to manual control, or be under control of the computer processor 157, to move the base 110 and/or the measuring sensor 140 relative to one another. Accordingly, this arrangement permits the object being measured to be presented to the measuring sensor 140 from a variety of angles, and in a variety of positions.

Embodiments of a CMM 100 include a mobile controller which may be referred-to as a jogbox (or "pendant") 190. The jogbox 190 includes a number of features that facilitate an operator's control of the coordinate measuring machine 100.

The jogbox 190 is not affixed to the coordinate measuring machine 100 in that its location is movable relative to the coordinate measuring machine 100. The mobility of the jogbox 190 allows an operator of the coordinate measuring machine 100 to move relative to the coordinate measuring machine 100, and relative to a workpiece 180 on which the coordinate measuring machine 100 operates. Such mobility may allow the operator to move away from the coordinate measuring machine 100 for safety reasons, or to get a broader view of the coordinate measuring machine 100 or the workpiece 180. The mobility of the jogbox 190 also allows the operator to move closer to the coordinate measuring machine 100 and the workpiece 180 on which it operates than would be possible using a fixed control console or computer 170, in order, for example, to examine or adjust the location or orientation of the workpiece 180, or the operation of the coordinate measuring machine 100.

To that end, the jogbox 190 is in data communication with the control system 150, and may be movably coupled to the control system 150 by a tether 191. In some embodiments, the jogbox 190 is in data communication with the communications interface 152 of the control system 150 via a tether 191 (which may be an Ethernet cable, a USB cable, or a Firewire cable, to name but a few examples), as schematically illustrated in FIG. 1B, and in other embodiments the jogbox 190 is in data communication with the communications interface 152 of the control system 150 via a wireless communications link, such as a Bluetooth connection, etc.

Storage Apparatus 200

Figure 2:
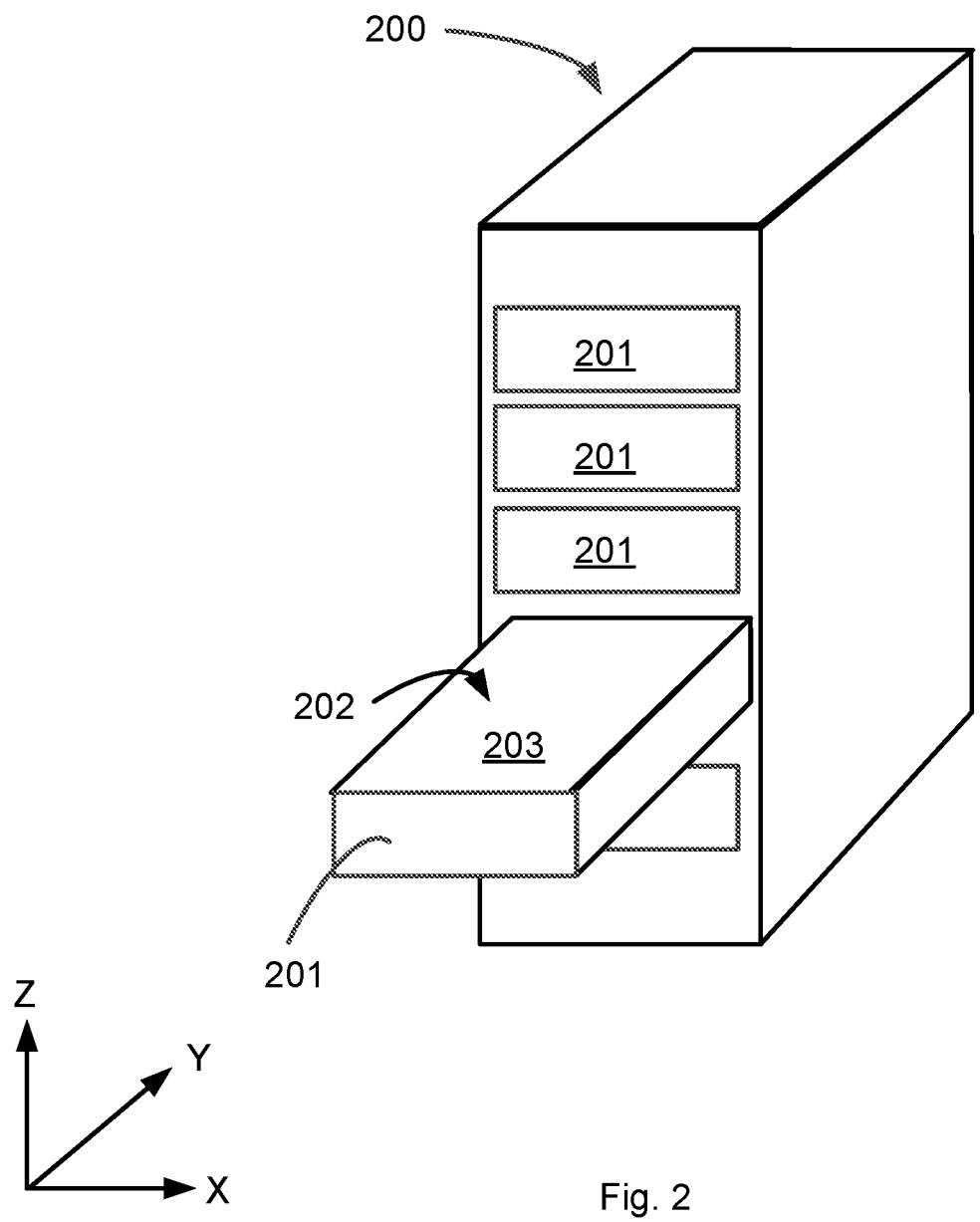
FIG. 2 schematically illustrates an embodiment of a storage apparatus for storing workpieces.

One or more workpieces 180 are stored in storage apparatus (or system) 200, an embodiment of which is schematically illustrated in FIG. 2. In this embodiment, the storage system 200 includes one or more drawers or shelves 201. The storage system defines a storage system coordinate system having three mutually orthogonal axes (axes X, Y and Z in FIG. 1A).

As schematically illustrated in FIG. 1A, each drawer or shelf 211 of a storage system 200 may have one or more storage plates 203 configured and disposed to hold the one or more workpieces 180. A storage plate 203 may have a plate surface 202.

Robot 300

Figure 3A:
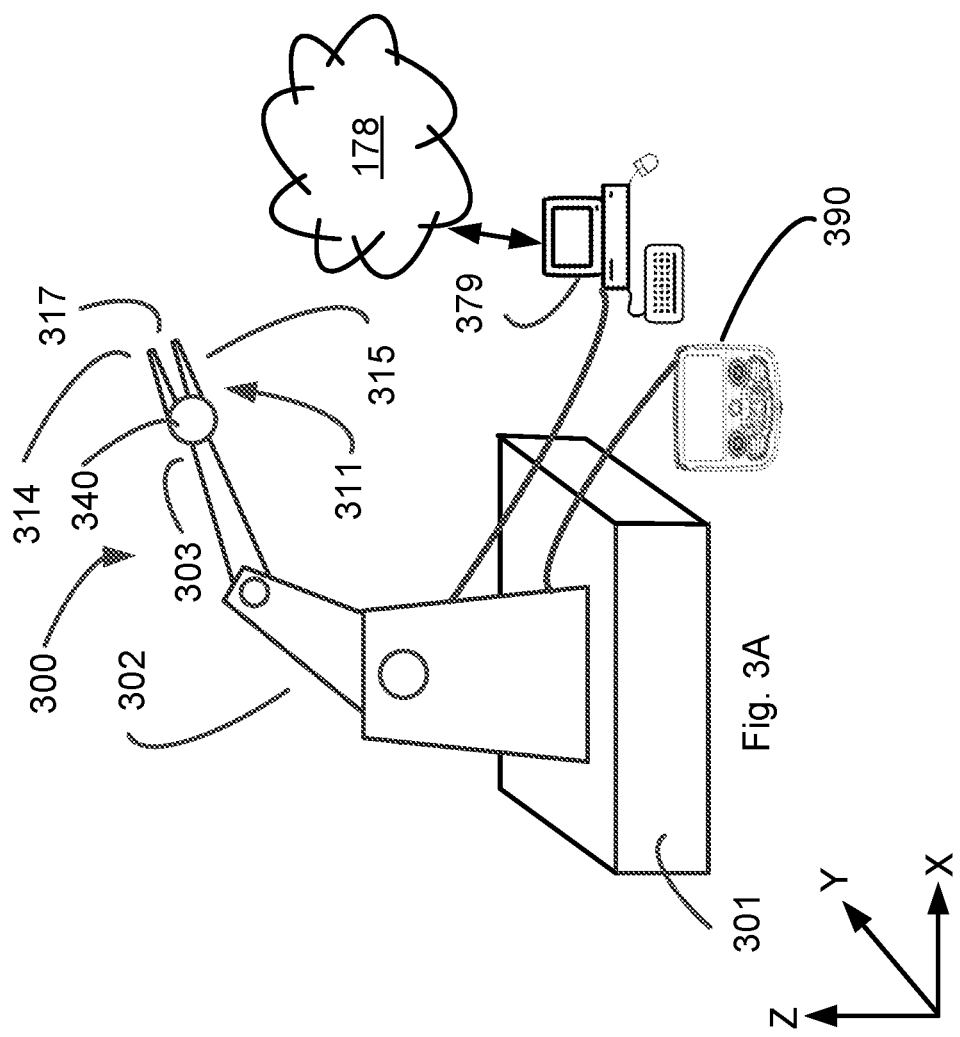
FIG. 3A schematically illustrates an embodiment of a workpiece placement robot.

A robot 300 is schematically illustrated in in FIG. 1A, FIG. 3A relative to the three mutually orthogonal axes (X, Y and Z in FIG. 1A).

In illustrative embodiments, robot 300 is disposed so that it can reach the drawer or shelf 201 of a storage apparatus 200, and each workpiece 180 of a set of workpieces disposed at the storage apparatus 200, as well as the measurement space 113 (e.g., table 111) of the coordinate measuring machine 100, and a set of workpieces on the storage apparatus 200 and coordinate measuring machine 100. When disposed in that manner, the robot 300 can transport a workpiece 180 from the drawer or shelf 201 to the measuring space 113 of the coordinate measuring machine 100, and can transport a workpiece 180 from the measuring space 113 of the coordinate measuring machine 100 to the drawer or shelf 201. To that end, the robot 300 in this embodiment has an effector 340, typically at the end 303 of a movable, articulated arm 302. In this embodiment, the end effector 340 is a gripper 311 at the end 303 of a movable, articulated arm 302.

In some embodiments, the gripper 311 has two or more fingers 314, 315 separated by a gripper gap 317. The gripper 311 is configured to controllably close and open the fingers 314, 315 to decrease or increase the gripper gap 317 (respectively) so as to grasp and release (respectively) a workpiece 180.

In illustrative embodiments, the robot 300 (e.g., motion of the robot arm 302 and/or motion of the gripper 311) is controlled by a robot controller. For example, in some embodiments, the robot 300 is controlled by robot control computer 379, or a robot control interface 390. In alternate embodiments, the robot 300 is controlled by the motion controller 153 or the host computer 170 of the coordinate measuring machine 100, which are separate and distinct from the robot control computer 379 and the robot control interface 390.

In illustrative embodiments, the robot arm 302 includes sensors configured to measure the location of the end 303 of the arm 302 relative to the base 301 of the robot 300, each location defined by a corresponding robot arm position datum.

FIG. 3B, FIG. 3C, and FIG. 3D each schematically illustrates an alternate embodiment of a robot 300, each of which is able to obtain a workpiece, move the workpiece, and deliver the workpiece to the measurement volume of a coordinate measuring machine 100 or other inspection instrument. The robot 300 in FIG. 3C has an arm 302 that is slidably coupled to base 301. In operation, the arm 302 slides along the base 301, in the X-axis, to move a workpiece in held by its effector 311. The arm 302 may also move the effector 311, and the workpiece, independently in the Y-axis and/or the Z-axis. The robot 300 in FIG. 3D has an arm 302 that is slidably and/or pivotably coupled to base 301. In the operation of some embodiments, the arm 302 slides relative to the base 301 in the X-axis to move a workpiece held by its effector 311, and/or pivots relative to the bases 301 to move the effector 311 and workpiece in the X-Y plane. The arm 302 may also move the effector 311, and the workpiece, independently in the Y-axis and/or the Z-axis.

Figure 4A:
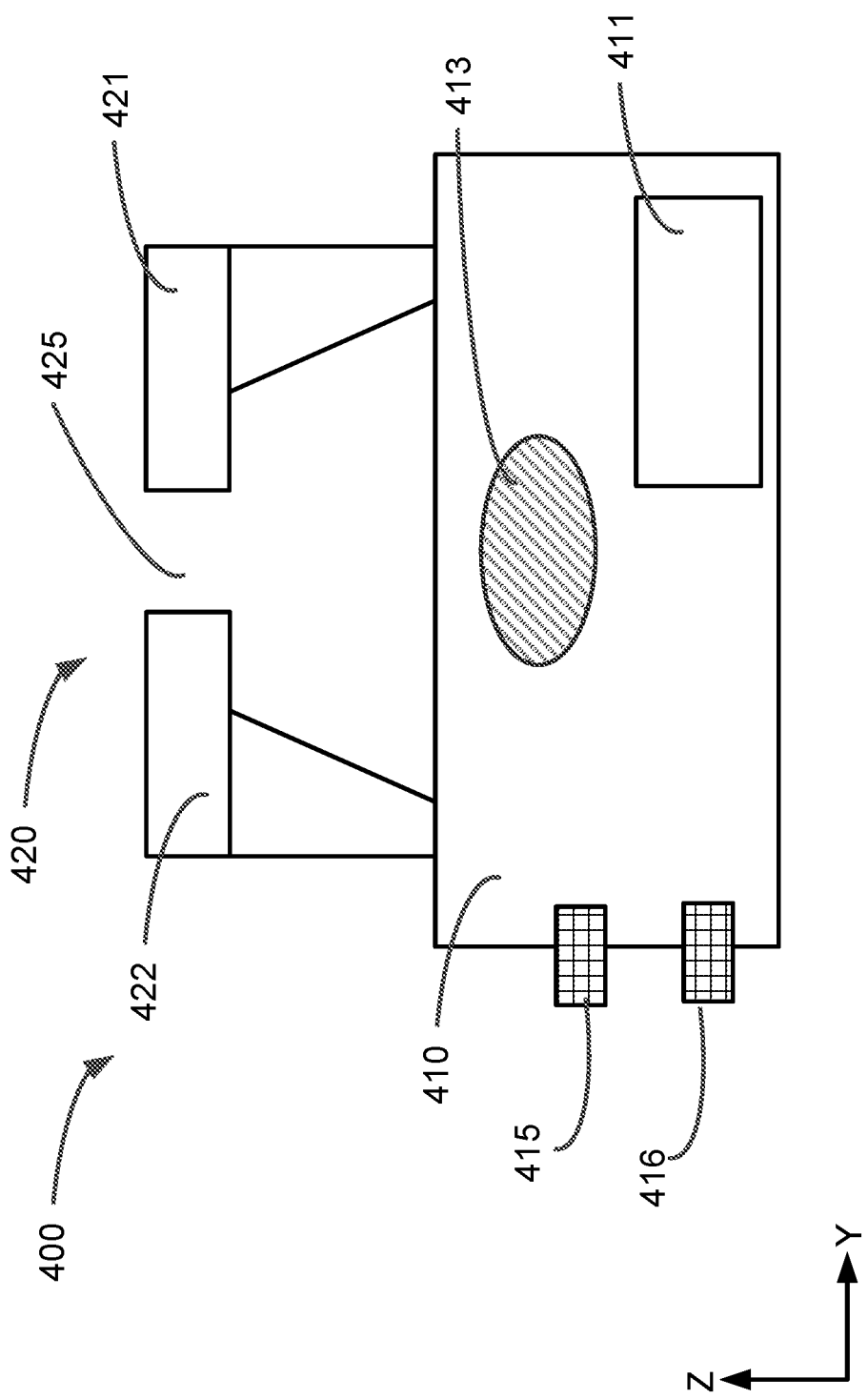
FIG. 4A schematically illustrates an embodiment of a workholder.

FIG. 4A schematically illustrates an embodiment of a workholder 400 (which may also be referred-to as a workpiece "fixture").

The workholder 400 has a base 410, which is configured to rest in a stable position on a surface, such as the table 111 of a coordinate measuring machine 100, for example. In some embodiments, the workholder is affixed to the coordinate measuring machine 100, and in some embodiments, the workholder 400 simply rests on the table 111 of the coordinate measuring machine 100.

The workholder 400 also has a workpiece interface 420 for receiving, securely holding, and releasing a workpiece 180, for example in the process of inspecting the workpieces with an inspecting machine 100. To that end, in this embodiment, the workpiece interface 420 has two clamp arms or jaws 421 and 422 (such as workpiece interface 420 may be referred to as a "clamp apparatus"). The jaws define a controllable workholder gap 425 between them, and the workpiece interface 420 may be referred-to as a clamp apparatus. For example, in some embodiments, both jaws 421 and 422 are movable relative to the base 410, and in some embodiments only one of the jaws, 421 or 422, is movable relative to the base. The workholder gap 425, which is the distance between the jaws 421, 422, is automatically controllable and can be opened (i.e., the workholder gap 425 increased) or closed (the workholder gap 425 decreased). Moreover, when a workpiece 180 is disposed within the workpiece interface (e.g., clamped by the jaws 421, 422), the amount of force or pressure exerted on the workpiece 180 by the workholder 400 (e.g., by the jaws 421, 422) is controllable based on the specific workpiece or type of workpiece 180 being held by the workholder 400. For example, a delicate workpiece 180 may be held with less clamping force imposed on the workpiece 180 by the jaws 421, 422 than the force imposed by the jaws 421, 422 on a more robust workpiece 180. In preferred embodiments, the clamping force imposed on the workpiece 180 by the jaws 421, 422 is sufficient to hold the workpiece 180 in a fixed position, relative to the workholder base 410, during inspection by an inspection machine 100 (e.g., a coordinate measuring machine), so the inspection operations do not cause the workpiece 180 to move, wiggle, or shift positions in response to said inspection operations.

Illustrative embodiments of a workholder 400 include, as an integral part of the workholder 400, a computer processor 411. The computer processor 411 may include a microprocessor from Intel or AMD, or a microprocessor based on an ARM core, or a microcontroller, to name but a few examples. The computer processor 411 may include a memory to store executable instructions (or "computer code"), which memory is accessible by the microprocessor or controller.

The computer processor 411 is in control communication with a workholder actuator 413, which is in control communication with one or more of the jaws 421, 422. The computer processor 411 is configured to control the actuator 413 to customize the configuration of the workpiece interface 420, for example to controllably open and close the workpiece interface gap 425 by moving one or both of the jaws 421, 422 pursuant to execution of computer code.

Alternatively, or in addition to the computer processor 411, some embodiments include a communications interface 415. In some embodiments, the communications interface 415 is coupled in electronic communication with the workholder actuator 413, and with a controller such as controller 91, host computer 170, or CMM controller 150. Control signals from the controller cause the actuator 413 to customize the configuration of the workpiece interface 420 for example to controllably open and close the workpiece interface gap 425 by moving one or both of the jaws 421, 422 pursuant to control signals received at the workholder 400 via the communications interface 415. In some embodiments, the communication interface 415 is coupled in data communication with computer processor 411 to instruct, control or operate the computer processor 411 to control the workholder actuator 413 to customize the configuration of the workpiece interface 420 for example to controllably open and close the workpiece interface gap 425 by moving one or both of the jaws 421, 422 pursuant to control signals received at the workholder 400 via the communications interface 415.

Figure 4B:
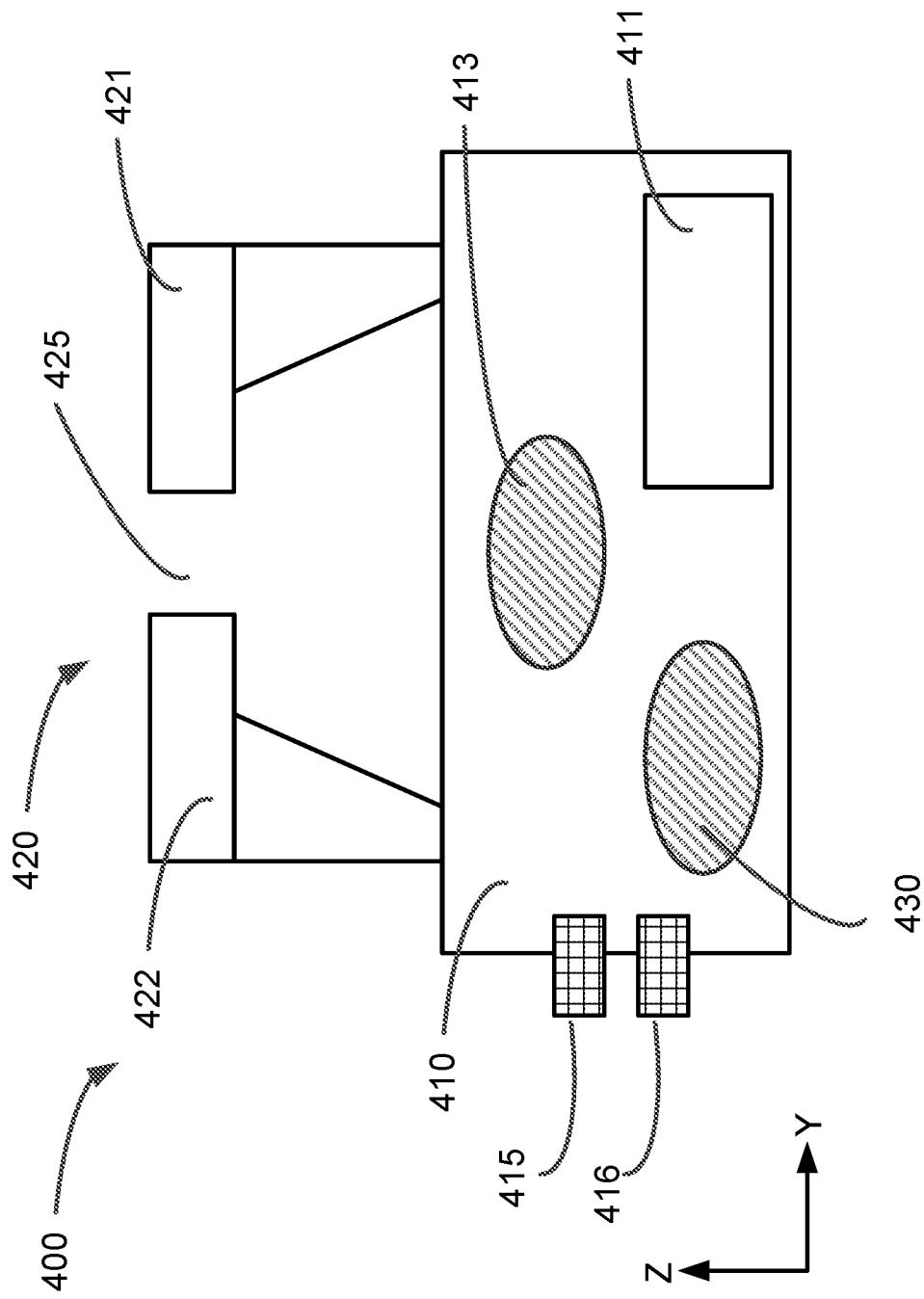
FIG. 4B schematically illustrates another embodiment of a workholder.

Some embodiments of a workholder 400 include a vibration actuator 430. FIG. 4B schematically illustrates an embodiment of such a workholder 400. When activated, the vibration actuator 430 causes the workholder 400, or at least the workpiece interface 420, to vibrate with a force and frequency sufficient to cause a workpiece 180 to settle onto and/or into the workpiece interface 420.

Some embodiments of the workholder 400 include a computer processor 411 as described above. In some embodiments, however, the computer processor 411 is also in control communication with the vibration actuator 430.

Alternatively, or in addition to the computer processor 411, some embodiments include a communications interface 415. In some embodiments, the communications interface 415 is coupled in electronic communication with the vibration actuator 430, to control the vibration actuator 430 to cause the workholder 400, or the workpiece interface 420, to vibrate. In some embodiments, the communications interface 415 is coupled in electronic communication with the computer processor 411 to provide executable code from an external memory to the computer processor 411, and/or to provide control signals to the computer processor 411.

In some embodiments, the vibration actuator 430 includes an electric motor that vibrates or physically oscillates when activated. For example, such an electric motor may have a motor shaft that rotates about and axis, and that motor shaft includes a weight coupled to the motor shaft such that the weight rotates eccentrically when the motor shaft rotates about its axis, such that the eccentric motion causes vibration of the motor and, because the motor is coupled to the workholder 400, vibration of the workholder interface 420.

In some embodiments, the vibration actuator 430 includes a fluid-driven apparatus, such as a pneumatic actuator. In such embodiments, the workholder may include a fluid connector 416 configured to receive a fluid to controllably drive the fluid-driven apparatus.

Figure 4C:
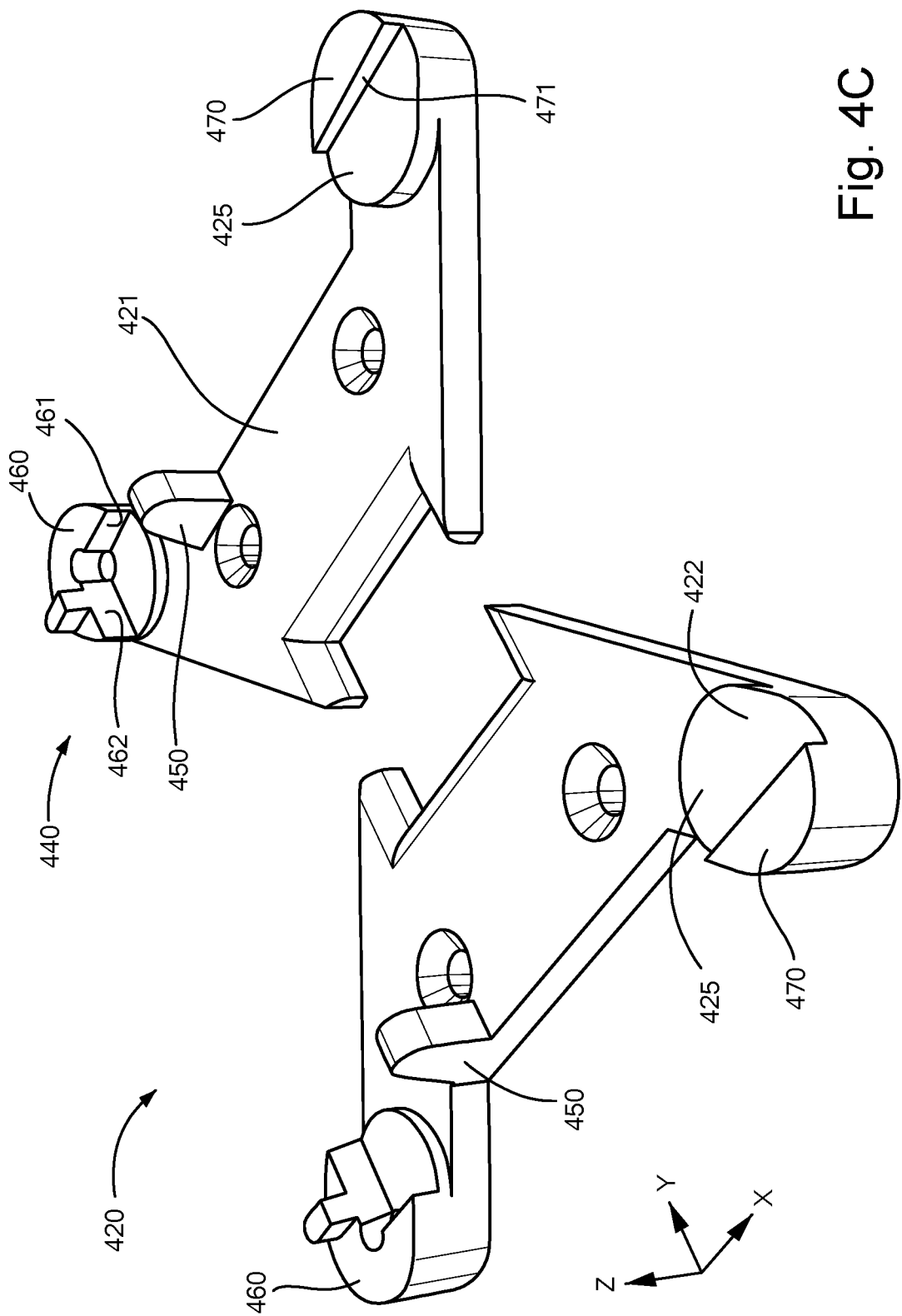
FIG. 4C schematically illustrates an embodiment of a workpiece interface.
Figure 4D:
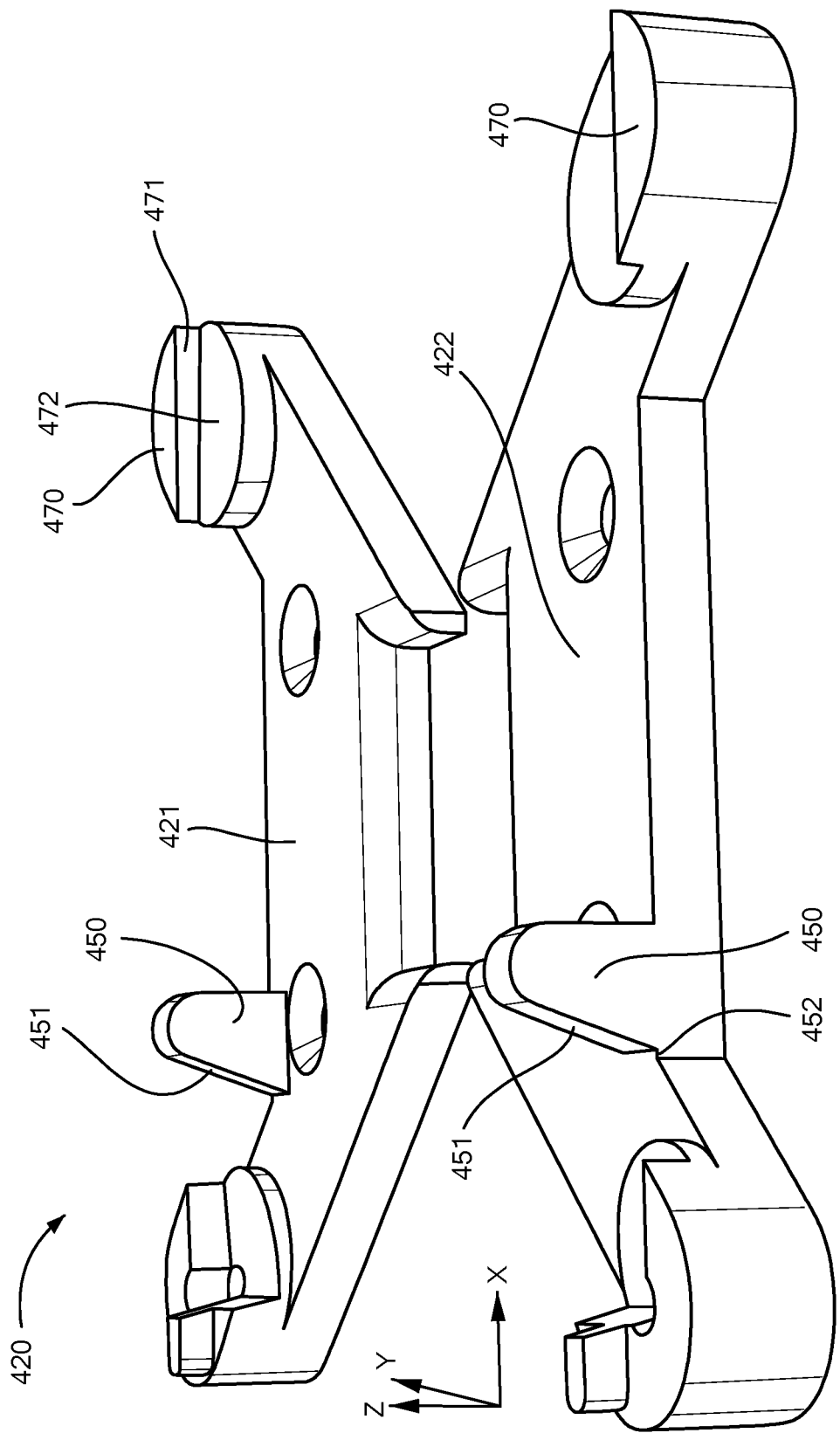
FIG. 4D schematically illustrates an embodiment of a workpiece interface.
Figure 4E:
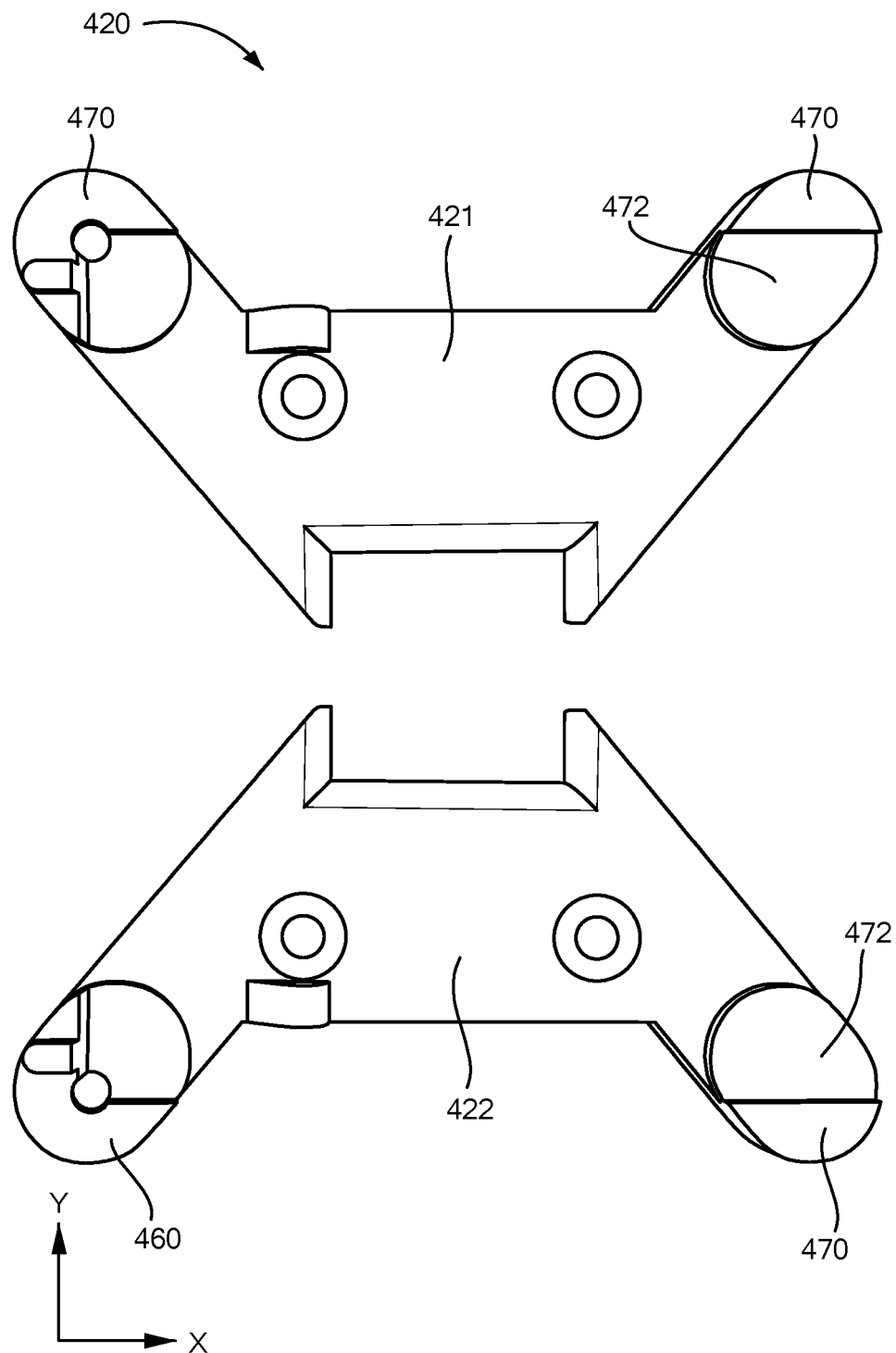
FIG. 4E schematically illustrates an embodiment of a workpiece interface.

Embodiments of various workpiece interfaces 420 are schematically illustrated in FIG. 4C, FIG. 4D and FIG. 4E. Each workpiece interface 420 of FIG. 4C, FIG. 4D and FIG. 4E may each be referred to as a workpiece clamp in that the workpiece interface 420 is configured to close to secure a workpiece 180, to hold the workpiece 180 during operations on the workpieces 180, such as operations by a machine tool or a coordinate measuring machine, and to controllably release the workpiece 180.

FIG. 4C schematically illustrates an embodiment of a workpiece interface 420. At least one clamp 421, 422 of the workpiece interface 420, and in some embodiments each clamp 421, 422 of the workpiece interface 420, includes a substrate 425, and defines a workpiece interface plane 440 (which may also be referred-to as a workpiece plane 440, or a substate plane 440), which in FIG. 4C is in the X-Y plane, or is parallel to the X-Y plane. In some embodiments, the workpiece interface plane 440 is coplanar with a surface of the substrate 425, and in some embodiments the workpiece interface plane 440 is not coplanar with a surface of the substrate 425. In use of the workpiece interface 420, a workpiece 180 may rest on the substrate 425.

The workpiece interface 420 also includes a set of tapered guides, where the set includes at least one tapered guide, and in some embodiments the set includes more than one tapered guide.

In some embodiments, a tapered guide includes a post 450 extending above the workpiece plane 440 in a direction away from the workpiece plane 440. The post 450 includes a slide surface 451 angled to intersect the substrate plane 440 at an intersection 452 such that the slide surface 451 and the substrate plane 440 form an obtuse angle at said intersection 452, the slide surface 451 disposed and configured to guide the workpiece 180 onto the substrate in response to vibrating the workpiece interface. In some embodiments, the slide surface 451 defines a slide surface plane, and is configured such that the plane intersects the substrate plane at an obtuse angle, such that the slide surface 451 is disposed and configured to guide the workpiece 180 onto the substrate in response to vibrating the workpiece interface.

Figure 4F:
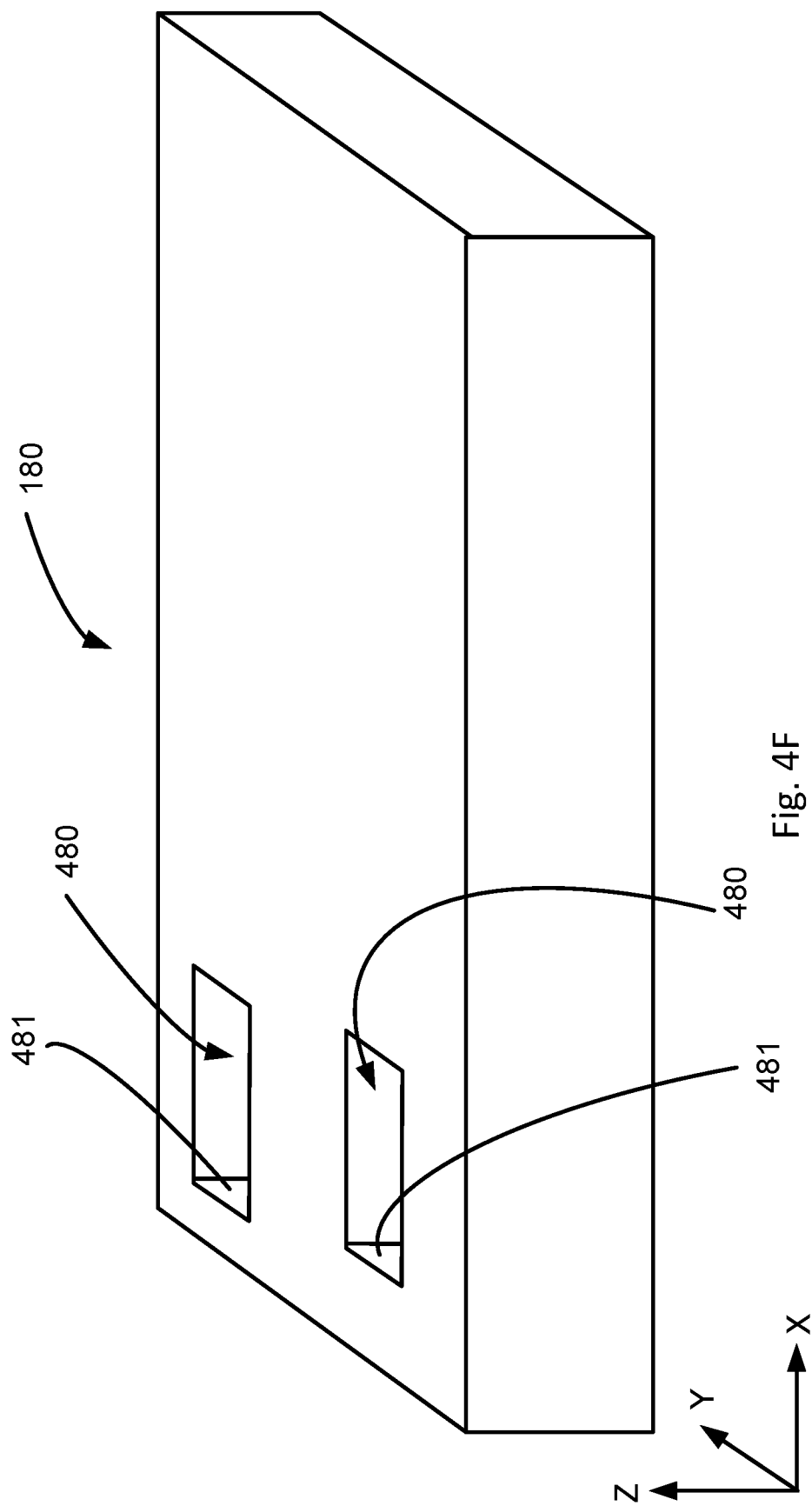
FIG. 4F schematically illustrates and embodiment of a workpiece.

In some embodiments, the tapered post 450 is configured to pass through an aperture 480 in the workpiece 180 (which may be referred-to as a "workpiece aperture"), which workpiece aperture 480 has an edge surface 481. Such a workpiece 180 is schematically illustrated in FIG. 4F. In such embodiments, the slide surface 451 is disposed and configured to engage the edge surface 481 to guide the workpiece 180 onto the substrate 425 in response to vibrating the workpiece interface 420. For example, the edge surface 481 slides down the slide surface 451 in response to vibrating the workpiece interface 420. Taking the workpiece interface 420 of FIG. 4D for example, one or more edge surfaces 481 engage one or more corresponding slide surfaces 451 to guide the workpiece 180 down onto or into the workpiece interface 420, including causing the workpiece 180 to move in the X-axis (specifically, in the negative direction of the X axis illustrated in FIG. 4D) as the edge surface 481 slides down the slide surface 451.

Some embodiments include a set of tapered guides, and each tapered guide has a surface extending away from the substrate plane, and disposed and configured to guide the workpiece onto the substrate in response to vibrating the workpiece interface.

Some embodiments include a corner guide 460 having two surfaces 461, 462, the two surfaces 461, 462, each extending upward away from the workpiece plane 440. In some embodiments, the two surfaces 461, 462 extend away from the workpiece plane 440 at a right angle (90 degrees, or orthogonal) to the workpiece plane 440.

The two surfaces 461, 462 are disposed at an angle to one another, so as to guide the workpiece onto the substrate 425 in two corresponding directions in response to vibrating the workpiece interface. In FIG. 4C the two corresponding directions are the X-axis for surface 462, and the Y-axis for surface 461.

In some embodiments, one or both of the surfaces 461, 462 are not tapered, in that they form a right angle with the workpiece plane 440. In such embodiments, the surfaces 461, 462 are configured to apply a clamping force to a workpiece 180, to assist in securing the workpiece 180 to the workpiece interface 420.

In some embodiments, one or both of the surfaces 461, 462 are tapered to form an acute angle with the workpiece plane 440 so as to urge a workpiece 180 down onto the substrate 425. In other embodiments, one or each of the two surfaces 461, 462 extend away from the workpiece plane 440 at an angle less than a right angle, such that the two surfaces 461, 462 are at an obtuse angle relative to the workpiece plane 440. Embodiments in which at least one of the surfaces 461, 462 is tapered may be considered to be a tapered guide.

Some embodiments include a pair of corner guides 460 disposed such that the pair of corner guides cooperate, in response to vibrating the workpiece interface, to automatically center the workpiece in at least one axis in the substrate plane 440. In the embodiment of FIG. 4C, a pair of corner guides, each numbered 460, cooperate to center a workpiece 180 in the Y-axis, for example by holding the workpiece between the two corner guides 460.

Some embodiments of the workpiece interface 420 include a set of one or more end stops 470. Each end stop 470 includes a wall 471 perpendicular to the substate plane 440. In illustrative embodiments, the wall 471 faces the direction in which the workpiece interface 420 closes. In illustrative embodiments, the wall 471 on one portion 421 of the workpiece interface 420 faces the other portion 422 of the workpiece interface 420.

In operation, the wall 471 engages the workpiece 180 to prevent the workpiece 180 from sliding off the workpiece interface 420, for example when the workpiece interface 420 is in the process of closing. Moreover, each end stop 470 of the set of end stops is disposed and configured to constrain the workpiece 180 while the workpiece 180 is clamped by the workpiece interface 420.

Some embodiments of end stop 470 include a porch 472. The port 472 maybe coplanar with the substate plane 440. In operation, the workpiece 180 rests on the porch 472. In some embodiments, one or more tapered guides guide the workpiece 180 to rest on the porch 472 in response to jiggling of the workpiece interface 420.

Some embodiments include a pair of corner guides 460 and a set of one or more end stops 470. Such embodiments constrain a workpiece 180 in three directions in (or parallel to) the substrate plane 440. In the embodiment of FIG. 4C, for example, the corner guides 460 and end stops 470 are configured to constrain a workpiece 180 resting on the substrate in the positive direction of the Y axis, and the negative direction of the Y axis, and in one direction of the X axis. The workpiece remains free to move in the other direction of the X axis.

Figure 5A:
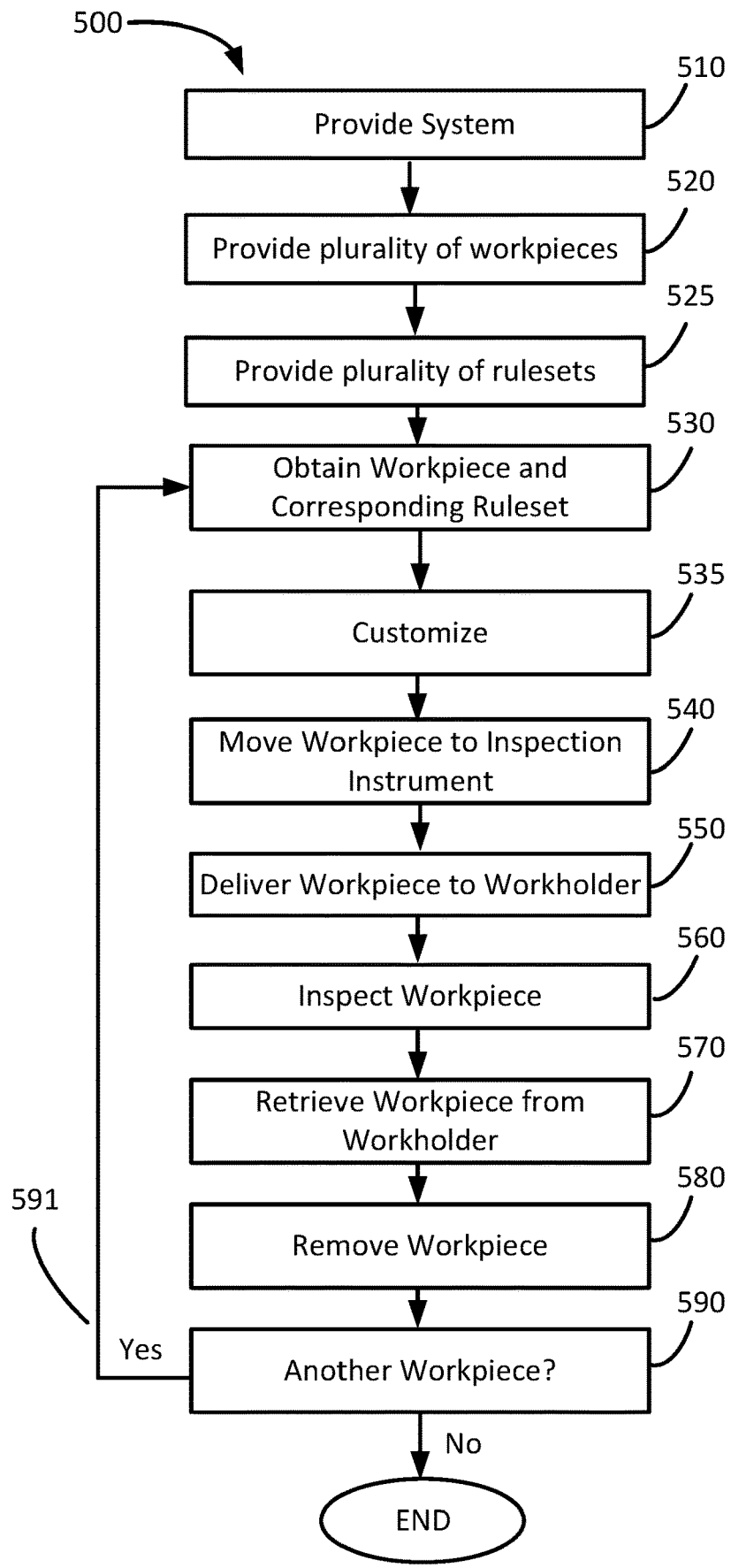
FIG. 5A is a flowchart of an embodiment of a method of sequentially measuring a set of workpieces using a workpiece inspection system.

FIG. 5A is a flowchart of an embodiment of a method 500 of sequentially measuring a series of workpieces 180 using an inspection system 90. The inspection system 90 customizes the configuration of one or more apparatuses of the inspection system 90 (e.g., robot 300), and/or customizes the operation of one or more apparatuses of the inspection system 90 (e.g., robot 300; workholder 400), to meet the requirements of each workpiece, for example where the workpieces are from difference families of workpieces. Parameters for adapting apparatuses and/or operations of apparatuses are stored in a ruleset 610 corresponding to each workpiece 180 (or corresponding to a family to which the workpiece 180 belongs), as described below, and are read by the controller 91, for example from a memory within or accessible by the controller 91, which controller then causes the adaption of the apparatuses and operations accordingly. In some embodiments, the memory within or ruleset database 92.

The method 500 includes, at step 510, providing the inspection system 90. In some embodiments, providing the inspection system 90 includes providing a workpiece inspection machine (e.g., coordinate measuring machine 100), and/or a workpiece storage apparatus 200, and/or a robot 300, and/or a controller 91.

The method 500 includes, at step 520, providing a plurality of workpieces for inspection by the inspection instrument. In some illustrative embodiments, the workpieces of the plurality of provided workpieces are non-identical to one another. In some illustrative embodiments, each workpiece of the plurality of provided workpieces belongs to a different family of a plurality of families of workpieces. In other words, each workpiece of the plurality of workpieces being from a different family of a plurality of families of workpieces. See, for example, workpieces 686 and 687 of family 684, and workpieces 688 and 689 of family 685, in FIG. 6B. Consequently, there are a plurality of families of workpieces, and each workpiece 180 may be said to "belong" to a corresponding one of the families of workpieces.

The method 500 includes, at step 525, providing a plurality of rulesets. Each ruleset 610 of the plurality of rulesets corresponds, respectively, to a family of the plurality of families of workpieces, and may be described as a "corresponding" ruleset for said family. See, for example, ruleset 624 corresponding to the workpieces 686 and 687 of family 684, and ruleset 625 corresponding to the workpieces 688 and 689 of family 685, in FIG. 6B.

Each corresponding ruleset includes parameters pursuant to which the controller 91 customizes a set of one or more instruments of the inspection system 90 to inspect a workpiece 180 from the family to which the workpiece 180 belongs. In illustrative embodiments, the plurality of rulesets are stored in a database in data communication with controller 91, or stored in a memory (e.g., a non-volatile memory) of controller 91.

The method 500 includes, at step 530, obtaining a workpiece 180 to be inspected by a workpiece inspection instrument (e.g., coordinate measuring machine 100), and obtaining a ruleset (a "corresponding ruleset") corresponding to that workpiece 180, such a ruleset corresponding to the family to which that workpiece belongs. In illustrative embodiments, the corresponding ruleset is retrieved, by the controller, from the database or memory in which a plurality of workpiece delivery rulesets is stored. In illustrative embodiments, step 530 includes retrieving, from the plurality of workpiece delivery rulesets, a ruleset corresponding to the family of said workpiece, said corresponding ruleset comprising a set of parameters to automatically customize transfer of the workpiece to a workholder.

Historically, obtaining a workpiece 180 has been done by having an operator provide the workpiece 180, or by having an operator manipulate a robot 300 to obtain the workpiece 180.

Some robots may be able to retrieve an object from a location automatically without operator intervention if the location of the object is accurately known to the robot, but in such cases conventional robots can only follow pre-programmed instructions, and lack the ability to adapt their actions to changing conditions. For example, conventional robots cannot automatically adapt their behavior to operate differently for different (e.g., non-identical) workpieces. Sometimes, when consecutively obtaining two workpieces 180 which workpieces 180 are not identical to one another, the robot's operation for obtaining the first workpiece 180 may not be appropriate for obtaining the second workpiece 180, such as when the second workpiece is more delicate than the first workpiece and therefore requires a lower gripping pressure by the gripper 311 than the first workpiece non-transient, or such as when the second workpiece 180 has a different shape than the first workpiece 180, and therefore requires that the gripper 311 grasp the second workpiece 180 in a location on the second workpiece 180 that is specific to that second workpiece 180, and which would not be possible or viable for grasping the first workpiece 180.

In illustrative embodiments, obtaining a workpiece 180 includes moving a robot arm 302 to the location of the workpiece 180 (e.g., storage 200) and grasping the workpiece 180 with an effector (e.g., robot gripper 311).

The method 500 includes, at step 535, customizing a set of instruments of the system. Step 535 may be described as customizing the transfer of workpieces to a workholder. In illustrative embodiments, one or more instruments of the set of instruments, and/or the operation one or more instruments of the set of instruments, are customized by the controller 91 pursuant to parameters from the corresponding ruleset for the particular workpiece 180 being moved. In other words, the controller 91 customizes (i) the set of instruments and/or (ii) the operation of the set of instruments pursuant to parameters from the corresponding ruleset. In some embodiments, step 535 includes sequentially, using the control system to: (a) customize at least one of (i) the configuration of the robot, and (ii) the operation of the robot, pursuant to the parameters of the corresponding ruleset; and subsequently (b) operate the robot to deliver said non-identical workpiece to the workholder.

In illustrative embodiments, automatically grasping a workpiece 180 (e.g., when the workpiece 180 is at a storage apparatus 200) by a robot 300 may involve one or more parameters (e.g., in a ruleset 610) that define aspects of the grasping operation. In illustrative embodiments, each workpiece 180 has a set of parameters that are specific to that workpiece 180 (and workpieces that are identical to that workpiece 180).

For example, grasping a first workpiece 180 may require the gripper fingers 314, 315 to be open to a gripper gap 317 of a first width prior to grasping the first workpiece 180. Consequently, the gripper gap 317 width for the first workpiece 180 may be a parameter in a first robot ruleset, which first robot ruleset corresponds to the first workpiece 180.

However, that gripper gap 317 width may not be sufficient for a second workpiece 180, for example if the second workpiece 180 requires the gripper fingers 314, 315 to be open to a gripper gap 317 of a second width, which is greater than the first width, prior to grasping the second workpiece 180. For example, the gripper 311 may need to open the gripper fingers 314, 315 to a gap of only 2 centimeters to grasp the first workpiece 180, but if the second workpiece has a diameter of 3 centimeters, then the gripper 311 may need to open the gripper fingers 314, 315 to a gap of 3 or 4 centimeters to grasp the second workpiece 180. Such adjustment and adaptations are easy for a human operator, but not conventionally automatically possible for a robot 300. Moreover, even a competent and experienced human operator can make a mistake and fail to make such an adjustment or adaptation, and may consequently damage the robot 300 and/or a workpiece 180, such as by causing the gripper 311 to collide with the workpiece 180, or by holding the workpiece 180 too loosely, allowing the workpiece 180 to shift positions within the gripper 311, or fall out of the gripper 311 entirely, in either case incurring damage.

Consequently, the gripper gap width 317 for the second workpiece 180 may be a parameter in a second robot ruleset, which second robot ruleset corresponds to the second workpiece 180. In operation, the controller 91 will read the gripper gap parameter from the first robot ruleset and cause the robot 300 to open the gripper fingers 314, 315 to the first gripper gap when obtaining the first workpiece. Similarly, the controller 91 will read the gripper gap parameter from the second robot ruleset and cause the robot 300 to open the gripper fingers 314, 315 to the second gripper gap when obtaining the second workpiece.

Similarly, for grasping workpieces 180, grasping a first workpiece 180 for a first family of workpieces 180 may require the gripper fingers 314, 315 to be closed to a first closed gripper gap 317 of a first width when closing the gripper fingers 314, 315 around the first workpiece 180. Consequently, the first robot ruleset may include a parameter specifying the gripper width 317 of the gripper fingers 314, 315 when grasping the first workpiece 180 from the first family of workpieces, and the controller 91 will read that parameter and cause the robot 300 to close gripper fingers 314, 315 accordingly to grasp the first workpiece 180. Similarly, a second robot ruleset may include a parameter specifying the gripper width 317 of the gripper fingers 314, 315 when grasping the second workpiece 180 of a different (e.g., second) family of workpieces, and the controller 91 will read that parameter and cause the robot 300 to close gripper fingers 314, 315 accordingly to grasp the second workpiece 180 from the second family of workpieces. In illustrative embodiments, a gripper gap 317 parameter may be specified as a quantitative distance (e.g., 2*mm*, 4*mm*, etc.), or may be specified in terms of the maximum and/or minimum width of the gripper gap 317 (e.g., open to the minimum gripper gap 317; close all the maximum gripper gap 317; close to 50% of the maximum gripper gap 317). In other embodiments, a gripper gap 317 parameter may be specified in terms of a force or pressure exerted by the griper on a workpiece 180 (e.g., close the gripper gap 317 until the gripper exerts a specified quantitative pressure is on the workpiece; open the gripper gap 317 until force or pressure exerted on the workpiece 180 by the gripper is at (or is reduced to) a specified quantitative pressure).

Next, the method includes operating the robot 300 to deliver said non-identical workpiece to the workholder 400.

To that end, the method 500 includes, at step 540, moving the workpiece 180, in the grasp of the gripper 311, to the inspection instrument. For example, step 540 includes, in some embodiments, moving the workpiece 180 to the measurement envelope 113 of the coordinate measurement machine 100. In illustrative embodiments, this includes moving the robot arm 302 so that the workpiece 180, in the grasp of the gripper 311, is within the measurement envelope 113 of the coordinate measurement machine 100. For example, the robot 300 may deliver the workpiece 180 to a workholder 400 at the table 111 of the coordinate measuring machine 100.

In some embodiments, the ruleset 610 corresponding to the workpiece 180 specifies one or more parameters for operating the robot 300 to move and/or release the workpiece 180. In some embodiments, the ruleset 610 corresponding to the workpiece 180 specifies a wait time parameter that quantitatively specifies a wait time between the time that the robot 300 grasps the workpiece 180, and the time the robot 300 begins moving the workpiece, and/or a parameter that defines a safe position (specified as a set of coordinates in the coordinate system of the system 90) for the effector 311 above or adjacent to the workpiece 180 to which the robot moves the effector 311 prior to grasping the workpiece, and/or an orientation of the effector at such a safe point prior to grasping the workpiece 180.

In some embodiments, the ruleset 610 corresponding to the workpiece 180 specifies a path through which the robot 300 moves the workpiece 180 in its grasp. For example, the ruleset 610 may specify that the robot 300 moves the workpiece 180 directly (e.g., in a straight line) from the point at which the robot 180 obtained the workpiece 180 to the point (the drop-off point) where the robot 300 is to deliver the workpiece 180. In some embodiments, the ruleset 610 corresponding to the workpiece 180 specifies that the robot 300 is to move the workpiece 180 directly downward (e.g., in the −Z axis of the coordinate system of the inspection system 90) after the workpiece 180 arrives at the drop-off point. That specification may quantitatively specify a fixed distance for that downward motion, or may specify that the downward motion continues until a threshold force of the workpiece 180 against a surface (e.g., the table of a coordinate measuring machine 100, or a surface of a workholder 400) is detected. In some embodiments, the ruleset 610 corresponding to the workpiece 180 specifies that the robot 300 is to move the workpiece 180 in a plane that is normal to the Z-axis (i.e., and X-Y plane) for a specified quantitative distance, or until a threshold force of the workpiece 180 against a surface (e.g., a surface of a workholder 400) is detected.

The method also includes step 550, at which the method 500 delivers the workpiece 180 to the workholder 400. In illustrative embodiments, a workpiece interface 420 of the workholder 400 is open to receive the workpiece 180.

In some embodiments, step 550 precedes step 540. In other embodiments, such as when a workholder 400 is already positioned on a coordinate measuring machine, step 550 follows step 540 and the robot 300 delivers the workpiece 180 to the workholder 400.

Some workholders 400 may be able to receive a workpiece 180 from a robot 300 without operator intervention or assistance, but in such cases conventional workholders can only follow pre-programmed instructions, and lack the ability to adapt their actions to changing conditions. For example, conventional workolders cannot adapt their behavior to operate differently for different (e.g., non-identical) workpieces 180. Sometimes, when consecutively receiving two workpieces 180 which workpieces 180 are not identical to one another, the workholder's operation for receiving (e.g., from the robot 300) the first workpiece 180 may not be appropriate for receiving the second workpiece 180, such as when the second workpiece is more delicate than the first workpiece and therefore requires a lower gripping pressure by the workolders than the first workpiece 180, or such as when the second workpiece 180 has a different shape than the first workpiece 180, and therefore requires that the workholder 400 grasp the second workpiece 180 in a location on the second workpiece 180 that is specific to that second workpiece 180, and which would not be possible or viable for grasping the first workpiece 180.

In some embodiments, the ruleset 610 corresponding to the workpiece 180 specifies one or more parameters for operating the workholder 400 to receive, and/or hold, and/or release the workpiece 180. In some embodiments, the ruleset 610 corresponding to the workpiece 180 specifies that the workpiece interface 420 is to be vibrated prior to clamping the workpiece 180 by the workpiece interface 180. Such specification may include the duration of such vibration, and/or the intensity of such vibration.

At step 560, the inspection instrument (e.g., coordinate measuring machine 100) inspects the workpiece 180 held in the workholder 400.

At step 570, typically after the inspection instrument completes or terminates its inspection of the workpiece 180 held in the workholder 400, the robot 300 retrieves the workpiece 180 from the workholder 400. Some robots 300 may be able to retrieve a workpiece 180 from a workholder 400 without operator intervention, but in such cases conventional robots 300 can only follow pre-programmed instructions, and lack the ability to adapt their actions to changing conditions. For example, conventional robots cannot adapt their behavior to operate differently for different (e.g., non-identical) workpieces. Sometimes, when consecutively obtaining two workpieces 180 which workpieces 180 are not identical to one another, the robot's operation for obtaining the first workpiece 180 may not be appropriate for obtaining the second workpiece 180.

Moreover, the operation of the workholder 400 may depend on, or be correlated to, the specific workpiece 180, such that the operation of the workholder 400 is different for each different workpiece. For example, each workpiece 180 may have specific corresponding requirements for how wide to open the jaws of the workholder 400, how fast to open the workholder 400, when to open the workholder relative to the motion or timing of the robot working to retrieve the workpiece 180 from the workholder 400, to name but a few examples.

At step 580, after grasping the workpiece 180 when the workpiece 180 is within the grasp of and under control of the robot 300, the method removes the workpiece from the workholder 400, and from the measurement envelope 113 of the coordinate measuring machine 100. In some embodiments, the robot 300 moves the workpiece 180 back to the workpiece storage apparatus 200. In other embodiments, the robot 300 moves the workpiece 180 to a different storage location, or to a location specified for storing workpieces 180 that have failed inspection. In some embodiments, when a workpiece 180 fails inspection by the coordinate measuring machine 100, the robot 300 physically changes the workpiece 180, for example by bending the workpiece 180, crushing the workpiece 180, or marking the workpiece 180, to name but a few examples.

At step 590, the method determines whether there is at least one additional workpiece 180 to be inspected by the coordinate measuring machine. If not ("No"), then the method ends, but if so ("Yes"), then the method loops (step 591) to step 530 to obtain the next workpiece 180 and its corresponding ruleset 610. In some embodiments, the next workpiece 180 is non-identical to the previously-inspected workpiece 180, and so parameters of the operation of the robot 300 and/or the workholder 400, and/or the coordinate measuring machine 100, may be automatically adjusted or adapted to customize the robot 300 and/or the workholder 400, and/or the coordinate measuring machine 100 to perform the steps of the method for that next workpiece 180.

Figure 5B:
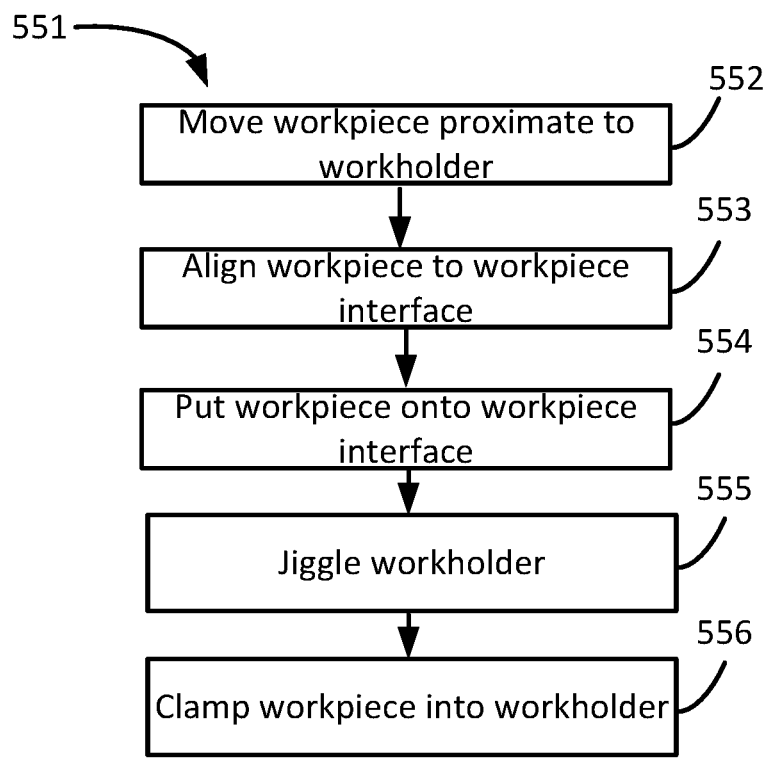
FIG. 5B is a flowchart of an embodiment of a method of operating a workholder.

FIG. 5B is a flowchart of an embodiment of a method 551 of delivering a workpiece to a workholder 400. Such a method may be employed, in some embodiments, at step 550.

Step 552 includes moving the workpiece 180 to a location near the workholder 400. In illustrative embodiments, a workpiece interface 420 of the workholder 400 is open to receive the workpiece 180. Illustrative embodiments moving the workpiece to a location near the work holder automatically using robot 300. In some embodiments moving the workpiece to a location near the workholder includes moving the workpiece to a location above a workpiece interface 420 (which in some embodiments may be a clamp apparatus) such that the workpiece interface 420 is between the workpiece 180 and the ground, so that gravity acts on the workpiece 180 to as to pull the workpiece 180 towards the workpiece interface 420.

Step 553 includes aligning the workpiece 180 to the workpiece interface 420, and step 554 includes disposing the workpiece 180 onto or into the workpiece interface 420.

Step 555 includes jiggling the workpiece interface 420 to cause the workpiece 180 to settle onto or into the workpiece interface 420. In some embodiments, jiggling the workpiece interface 420 includes jiggling the entire workholder 420 while the workpiece 180 is in physical contact with the workholder 420. In illustrative embodiments, step 555 is performed prior to closing the workpiece interface 420, and separate from closing the workpiece interface 420.

The act of jiggling the workpiece interface 420 to cause the workpiece 180 to settle onto or into the workpiece interface 420 includes controllably and deliberately causing the workpiece interface 420 to physically oscillate or vibrate.

In some embodiments, jiggling the workpiece interface 420 (e.g., causing the workpiece interface 420 to physically oscillate or vibrate) includes activating an actuator coupled to the workpiece interface 420 and/or to the workholder 400.

For example, in embodiments of a workholder 400 that include a workholder actuator 413, causing the workpiece interface 420 to physically oscillate or vibrate may include causing the workholder actuator 413 to cause the workholder interface 420 to perform a closing motion, followed by an opening motion before the workholder interface 420 secures the workpiece 180 to the workholder 400. To that end, if the workholder actuator 413 includes an electric motor, causing the workpiece interface 420 to physically oscillate or vibrate may include controllably operating the electric motor to turn in a first direction to cause the workholder interface 420 to perform a closing motion, followed by controllably operating the electric motor to turn in a second direction to cause the workholder interface 420 to perform an opening motion. In an embodiment in which the workholder actuator includes a fluid-drive actuator (e.g., a pneumatic actuator), causing the workpiece interface 420 to physically oscillate or vibrate may include controllably operating the fluid-drive actuator to apply a closing force to one or both of the first clamp arm 421 and the second clamp arm 422 to cause a closing motion, followed by controllably operating the fluid-drive actuator to apply an opening force to one or both of the first clamp arm 421 and the second clamp arm 422 to cause an opening motion.

In some illustrative embodiments, an actuator 413 for controllably closing the workpiece interface 420 is configured to close the workpiece interface 420 by causing the workpiece interface to execute a closing motion, and is also configured to alternately open the workpiece interface 420 by causing the workpiece interface 420 to execute an opening motion, such that the actuator 413 is configured to alternately and controllably open and close the workpiece interface 420. In such embodiments, the workholder 400 further includes a controller 411 to controllably vibrate the workpiece interface 420 (to settle the workpiece into the workpiece interface 420) by causing the actuator 413 to execute, alternately, a plurality of opening motions and closing motions, without changing or replacing the workpiece 180 between said opening motions and closing motions, and prior to closing the workpiece interface 420 to secure the workpiece.

In embodiments of a workholder 400 that include a vibration actuator 430, causing the workpiece interface 420 to physically oscillate or vibrate may include operating the vibration actuator 430 to transmit vibrations to the workpiece interface 420. For example, in embodiment in which the vibration actuator 430 includes an electric motor, operating the vibration actuator 430 to transmit vibrations to the workpiece interface 420 may include causing the electric motor to turn. In an embodiment in which the vibration actuator 430 includes a fluid-driven actuator (e.g., a pneumatic actuator), operating the vibration actuator 430 to transmit vibrations to the workpiece interface 420 may include operating the fluid-driven actuator alternately to provide force in a first direction, followed by causing the fluid drive actuator to provide force in a second direction opposite the first direction.

In illustrative embodiments, the act of jiggling the workpiece interface 420 is separate from the act of closing the workpiece interface 420, and any vibration, oscillation or jiggling caused by or incidental to the act of closing the workpiece interface 420 to clamp or secure the workpiece 180 is separate from the act of jiggling the workpiece interface 420 at step 555.

In illustrative embodiments, step 555 is performed prior to closing the workpiece interface 420, and separate from closing the workpiece interface 420.

Subsequent to jiggling the workpiece interface 420, step 556 includes securing the workpiece 180 onto or into the workholder 400. In illustrative embodiments, clamping the workpiece 180 onto or into the workholder 400 includes closing the workpiece interface 420 to clamp the workpiece 180 securely.

Figure 6A:
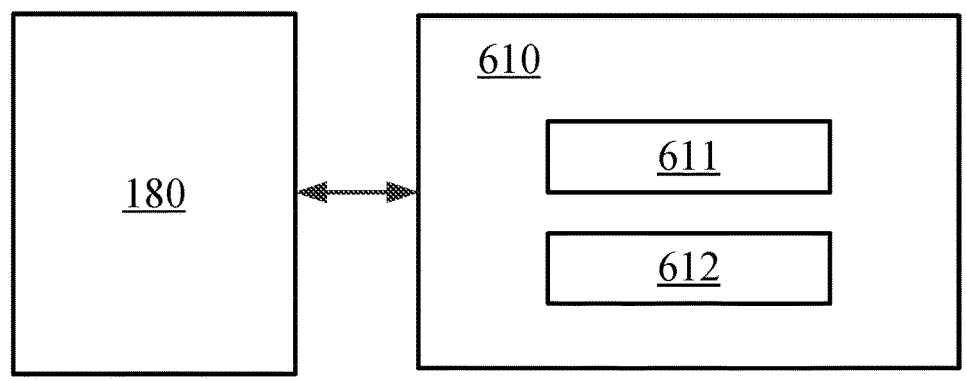
FIG. 6A schematically illustrates a ruleset.

FIG. 6A schematically illustrates a ruleset 610 that includes and provides parameters (or "rules") that specify one or more parameters or instructions for the operation of one or more inspection instruments of a workpiece inspection system 90. Rulesets may also be referred-to as "parameter sets." A ruleset 610 may include, for example, parameters for operating a robot 300 as part of an inspection system 90, and/or parameters for operating a workholder 400 as part of an inspection system 90, to name but a few examples. For example, a ruleset that includes parameters for operating a robot 300 may be referred to as a "robot ruleset." A ruleset that includes parameters for operating a workholder 400 may be referred to as a "workholder ruleset." FIG. 6A schematically illustrates a ruleset 610 that may have a robot ruleset 611 and/or a workholder ruleset 612. In general, a ruleset 610 may be provided in a JSON database file, or an XML file.

A ruleset 610 may include one or more of the following parameters:

- A parameter specifying that the workpiece interface 420 is to be vibrated prior to clamping the workpiece 180 by the workpiece interface 180. Such a parameter may include the duration of such vibration, and/or the intensity of such vibration.
- A parameter specifying a pre-grasp width of gripper opening gap 317 for obtaining (e.g., grasping or picking-up) the corresponding workpiece 180, pursuant to which the system controller 91 causes the gripper to open to the specified pre-grasp width; and/or
- A parameter specifying a width of gripper opening gap 317 for releasing (e.g., dropping or letting go of) the corresponding workpiece 180, pursuant to which the system controller 91 causes the gripper to open to the specified release width;
- A parameter instructing the robot 300 to open the gripper to its maximum gap 317, pursuant to which the system controller 91 controls the robot 300 to open the gripper 311 to its maximum width; and/or
- A parameter quantitatively specifying a gap which gap is less than the maximum gap of the grippe 311, pursuant to which the system controller 91 controls the robot 300 to open the gripper 311 to the specified gap; and/or
- A parameter instructing the robot 300 to close the gripper 311 to its minimum gap; and/or
- A parameter specifying a wait time between the robot's effector arriving at a location of a workpiece 180 and a step of grasping said workpiece 180, pursuant to which the system controller 91 causes the robot to delay grasping the workpiece until said wait time has elapsed; and/or
- Specification of a safe position above a workpiece 180 prior to grasping the workpiece 180 for delivery to a workpiece inspection machine 100, the safe position specified in coordinates of the inspection system 90, pursuant to which the system controller 91 causes the robot 300 to move the effector to the safe position prior to grasping the workpiece;
- Specification of the orientation of the robot's effector relative to the workpiece 180 prior to grasping the workpiece 180 for delivery to a workpiece inspection machine 100, pursuant to which the system controller 91 causes the robot 300 or orient the effector to the specified orientation relative to the workpiece 180 prior to grasping the workpiece 180; and/or
- Specification of a safe position above a workholder 400 prior to delivering the workpiece 180 to the workholder 400, pursuant to which the system controller 91 causes the robot 300 to move the workpiece 180 to the safe position above the workholder 400 prior to delivering the workpiece 180 to the workholder 400; and/or
- A parameter specifying an orientation of the effector holding a workpiece 180 prior to delivering the workpiece 180 to the workholder 400, the orientation specified relative to the workholder 400 into which the workpiece 180 is to be placed, pursuant to which the system controller 91 causes the robot 300 to orient the workpiece to the specified orientation; and/or A parameter specifying a path pursuant to which the robot 300 to moves the workpiece 180 directly to the workholder 400 in a direction normal to the workpiece interface until the workholder 400 applies to the workpiece 180 a specified quantitative force; and/or A parameter specifying a path pursuant to which the system controller 91 causes the robot 300 to move the workpiece 180 the workholder 400 in a direction in a plane, which plane is normal to an axis that is normal to the workpiece interface, until the workholder 400 applies to the workpiece 180 a specified quantitative force; and/or A parameter specifying that the workholder 400 should open the workpiece interface to its maximum workholder gap, pursuant to which the controller controls the workholder to open the workpiece interface to its maximum workholder gap; and/or A parameter specifying that the workholder 400 should close the workpiece interface to its minimum workholder gap, pursuant to which the controller controls the workholder to close the workpiece interface to its minimum workholder gap; and/or A parameter quantitatively specifying that the workholder 400 should open the workpiece interface to a specified distance, pursuant to which the controller controls the workholder to open the workpiece interface to the specified distance; and/or A parameter quantitatively specifying a closing force applied to the workpiece 180 by the workpiece interface, pursuant to which the controller controls the workholder to close its workpiece interface until in said closing force is applied; and/or A parameter quantitatively specifying an opening force applied to the workpiece 180 by the workpiece interface, pursuant to which the controller controls the workholder to open its workpiece interface until said opening force is applied; and/or A parameter specifying a maximum closing speed for closing the workpiece interface, pursuant to which the controller controls the workholder to open the workpiece interface at a speed not greater than the specified maximum closing speed; and/or A parameter quantitatively specifying a closing delay time between (a) positioning of the workpiece 180 by a robot 300 in a specified position relative to the workpiece interface, and (b) closing of the workpiece interface to grasp the workpiece 180, pursuant to which the controller controls the workholder to delay closing the workpiece interface until such closing delay time has elapsed; and/or A parameter quantitatively specifying an opening delay time between (a) completion of an inspection operation by a workpiece inspection machine 100, and (b) opening the workpiece interface to release the workpiece 180, pursuant to which the controller controls the workholder to delay opening the workpiece interface until such opening delay time has elapsed, to name but a few examples.

One or more instruments, or the operation of one or more instruments, of a system 90 under control of controller 91 may be customized pursuant to any one or more of the parameters described above.

Figure 6B:
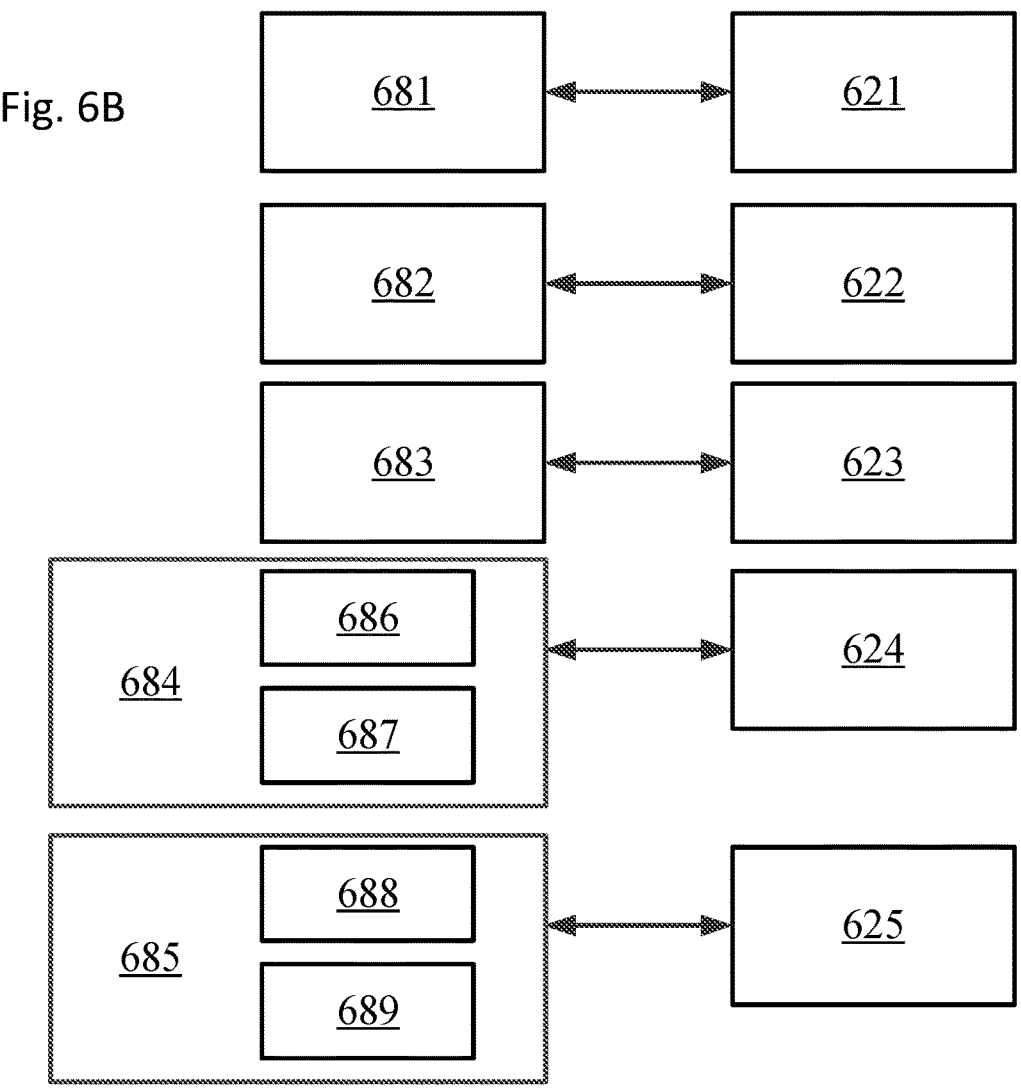
FIG. 6B schematically illustrates correlations between workpieces and corresponding rulesets.

FIG. 6B schematically illustrates several rulesets, each of which may be described generally as a ruleset 610. FIG. 6B includes several non-identical workpieces 681, 682, and 683. Each non-identical workpiece 681, 682, 683 and 684 has a corresponding non-identical ruleset, in this embodiment rulesets 621, 622, and 623, respectively. More specifically in this embodiment, workpiece 681 has a corresponding ruleset 621; workpiece 682 has a corresponding ruleset 622; and workpiece 683 has a corresponding ruleset 623. Each ruleset 621-623 specifies operational parameters and/or instructions for controlling instruments of an inspection system 90 operating on the workpiece 681-683 corresponding to the ruleset.

FIG. 6B also schematically illustrates two families of parts, family 684 and family 685, each of which includes a set of parts. In each family, each workpiece is associated with the same (or an identical) workpiece delivery ruleset (624 and 625, respectively, in this example) for customizing the configuration and/or the operation of at least one instruments of the set of instruments of a workpiece inspection system to move a workpiece and deliver the workpiece to a workholder. The workpieces in said set of workpieces may identical to one another, or may be non-identical to one another, as long as the customization or configuration of said set of instruments of a workpiece inspection system is performed pursuant to the same (or an identical) workpiece delivery ruleset.

In an illustrative embodiment, family 684 includes a set having a plurality of parts. In the example of FIG. 6B, the parts are numbered 686 and 687. In some embodiments, the plurality of parts 686 and 687 are identical to one another, and in other embodiments, the plurality of parts 686 and 687 are non-identical to one another. In either case, each of the plurality of parts 686 and 687 is movable, by the robot 300, pursuant to ruleset 624.

In an illustrative embodiment, family 685 includes a set having a plurality of parts. In the example of FIG. 6B, the parts are numbered 688 and 689. In some embodiments, the plurality of parts 688 and 689 are identical to one another, and in other embodiments, the plurality of parts 688 and 689 are non-identical to one another. In either case, each of the plurality of parts 688 and 689 is movable, by the robot 300, pursuant to ruleset 625.

In operation, as part of obtaining a workpiece 180 at step 530, an inspection system also obtains the ruleset for that workpiece 180. For example, if an inspection system is operating on workpiece 681, the system will obtain ruleset 621; and if the inspection system is operating on workpiece 682, the system will obtain ruleset 622. As another example, if the inspection system is operating on either workpiece 686 or workpiece 687, the system will obtain ruleset 624. As another example, if the inspection system is operating on either workpiece 688 or workpiece 688, the system will obtain ruleset 627. To that end, the ruleset 610 may be stored in a memory 156 of a CMM controller; or in a memory of a computer 170 or computer 179, to name but a few examples, each such ruleset 610 stored with information correlating the ruleset to a corresponding workpiece 180.

In some embodiments, the system (e.g., system controller 91) recognizes or identifies each workpiece 180 obtained at step 530, and in response identifies and retrieves the ruleset 610 corresponding to that workpiece 180. For example, a system controller 91 may recognize or identify a workpiece 180 by imaging the workpiece 180 with a camera (e.g., CMM camera 141) and assessing the image. For example, a system controller 91 may identify a workpiece 180 in an image by assessing the image with one or more neural networks trained to recognize or identify a workpiece in an image. In other embodiments, workpiece inspection codes executing on a system controller 91 may specify each workpiece in a sequence of workpiece to be inspected, and contemporaneously identify and retrieve the ruleset corresponding to each such workpiece.

According to the foregoing, some embodiments include a workpiece inspection system for sequentially delivering each workpiece of a plurality of workpieces, each workpiece being from a different family of workpieces, to a workholder. In some embodiments, the system includes a set of instruments, the set of instruments comprising a workpiece inspection instrument and a robot disposed to deliver to the workholder each workpiece of the plurality of workpieces, each workpiece of the plurality of workpieces being from a different family of a plurality of families of workpieces; a control system in control communication with the set of instruments of the workpiece inspection system, the control system configured to, for each workpiece: retrieve, from a plurality of workpiece delivery rulesets, a ruleset corresponding to the family of said workpiece, said corresponding ruleset comprising a set of parameters to automatically customize transfer of the workpiece to the workholder; and sequentially customize at least one instrument of the system and/or operation of at least one instrument of the system, according to any one or more of the parameters described above.

For example, in some embodiments the system (via controller 91) customizes at least one of (i) the configuration of the robot, and (ii) the operation of the robot, pursuant to the parameters of the corresponding ruleset; and subsequently (b) operates the robot to deliver said non-identical workpiece to the workholder.

In some embodiments, the corresponding ruleset includes a parameter quantitatively specifying a closing delay between (a) positioning of the workpiece by the robot in a specified position relative to the workpiece interface, and (b) closing of the workpiece interface to grasp the workpiece, pursuant to which the control system the control system customizes the operation of the workholder to close the workpiece interface after passing of said closing delay.

REFERENCE NUMBERS

Reference numbers used herein include the following:
90: Workpiece inspection system;
91: Workpiece inspection system controller (or "computer implemented controller");
92: Ruleset database;
100: Coordinate measuring machine;
101: Floor;
102: Environment;
110: Base;
111: Table;
112: Plane;
113: Measurement space (or measurement envelope);
115: Probe rack;
120: Moveable features;
121: Bridge legs;
122: Table scale;
123: Bridge;
124: Bridge scale;
125: Carriage;
126: Spindle;
127: Spindle scale;
128: Bearing;
130: Arm;
131: Moveable joint;
132: Rotary encoder;
140: Measuring sensor;
141: Camera;
142: Environmental sensor;
150: Control system;
151: Bus;
152: Communications interface;
153: Motion Controller;
154: Measurement analyzer;
155: Sensor input;
156: Memory;
157: Computer processor;
160: User interface;
161: X-axis controls;
162: Y-axis controls;
163: Z-axis controls;
165: Camera motion controls;
166: Camera focus control;
167: Camera record control;
170: Host computer;
171: Screen;
172: Keyboard;
173: Mouse;
174: Computer memory;
175: Memory interface/communications port;
176: Communication link;
178: Network;
179: Computer;
180: Workpiece;
181: Geometry;
182: Edge;
183: Corner;
184: Flat surface;
185: Curved surface;
186: Cavity;
187: Inside angle;
188: Waviness;
189: Surface finish;
190: Jogbox;
191: Cable;
200: Workpiece storage apparatus;
201: Storage container;
202: Storage plate surface;
203: Storage plate;
300: Robot;
301: Robot base;
302: Robot arm;
303: Distal end of robot arm;
311: Robot gripper;
314: First gripper finger;
315: Second gripper finger;
317: Robot gripper gap;
340: Robot end effector (e.g., gripper, etc.);
379: Robot control computer;
390: Robot control interface;
400: Workholder;
410: Workholder base;
411: Workholder processor;
413: Workholder actuator;
415: Communications interface;
416: Fluid Interface;
420: Workpiece interface;
421: First clamp arm;
422: Second clamp arm;
425: Controllable workholder gap;
430: Vibration actuator;
450: Post;
451: Slide surface;
460: Corner guide;
461 and 462: surfaces;

470: End stop;
471: Porch;
472: Wall of end stop;
480: Workpiece aperture;
481: Edge of workpiece aperture.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of operating a workholder having a workpiece interface configured to controllably clamp a workpiece, the method comprising:
placing the workpiece into the workpiece interface, the workpiece interface being open to receive the workpiece;
prior to closing the workpiece interface, and separate from closing the workpiece interface, vibrating the workpiece interface to settle the workpiece into the workpiece interface; and subsequent to vibrating the workpiece interface
closing the workpiece interface to secure the workpiece to the workholder.

P2. The method of P1, further comprising delivering, by a robot, the workpiece proximate to the workpiece interface, and pausing for a pre-established amount of time prior to placing the workpiece into the workpiece interface.

P3. The method of any of P1-P2, wherein:
the workholder comprises a workholder actuator operably coupled to the workpiece interface to controllably close the workpiece interface, and
vibrating the workpiece interface comprises operating the workholder actuator without closing the workpiece interface.

P4. The method of any of P1-P3, wherein:
the workholder comprises a workholder actuator operably coupled to the workpiece interface to controllably open the workpiece interface with an opening motion, and to controllably close the workpiece interface with a closing motion, and
vibrating the workpiece interface to settle the workpiece into the workpiece interface comprises alternating the workholder actuator between an opening motion and a closing motion.

P5. The method of any of P1-P4, wherein the workholder comprises a vibration actuator in addition to the workholder actuator, and
vibrating the workpiece interface comprises operating the vibration actuator without closing the workpiece interface; and
closing the workpiece interface comprises operating workholder actuator separately from operating the vibration actuator.

P6. The method of any of P1-P5, wherein the workpiece interface comprises a substrate defining a substrate plane and a set of guides, each guide of the set of guides having a surface extending away from the substrate plane, and disposed and configured to guide the workpiece onto the substrate in response to vibrating the workpiece interface.

P7. The method of P6, wherein the set of guides includes a tapered post, the tapered post having a slide surface angled to intersect the substrate plane at an intersection such that the slide surface and the substrate plane form an obtuse angle at said intersection, the slide surface disposed and configured to guide the workpiece onto the substrate in response to vibrating the workpiece interface.

P8. The method of P7, wherein the workpiece defines a workpiece aperture having an edge, and the tapered post is configured to pass through the workpiece aperture and the slide surface is disposed and configured to engage the edge to guide the workpiece onto the substrate in response to vibrating the workpiece interface.

P9. The method of P6, wherein the set of guides includes a corner guide having two surfaces, the two surfaces extending away from the substrate plane, the two surfaces disposed at an angle to one another, so as to guide the workpiece onto the substrate in two corresponding directions in response to vibrating the workpiece interface.

P10. The method of P6, wherein the set of guides includes a pair of corner guides, each corner guide of the pair of corner guides having two tapered surfaces, the two tapered surfaces disposed at an angle to one another, so as to guide the workpiece onto the substrate in two corresponding directions in response to vibrating the workpiece interface, wherein the pair of corner guides cooperate, in response to vibrating the workpiece interface, to automatically center the workpiece in at least one axis on the substrate plane.

P11. The method of any of P1-P10, wherein the workpiece interface comprises a substrate defining a substrate plane, and having a set of end stops, each end stop of the set of end stops having a set of end stop faces extending in a direction away from the substrate plane, each end stop of the set of end stops disposed and configured to constrain the workpiece while the workpiece is clamped by the workpiece interface.

P12. A workholder to receive and securely hold a workpiece, the workholder comprising:
a base;
a workpiece interface coupled to the base, the workpiece interface configured to open into an open configuration to receive a workpiece, and configured to close into a closed position to secure the workpiece; and
a set of actuators, at least one actuator of the set of actuators operably coupled to the workpiece interface to controllably close the workpiece interface; and
at least one actuator of the set of actuators operably coupled to the workholder to controllably vibrate the workpiece interface independent of closing the workpiece interface.

P13. The workholder of P12, wherein the set of actuators includes a workholder actuator, said workholder actuator is operably coupled to the workpiece interface and configured:
to controllably open the workpiece interface with an opening motion, and to controllably close the workpiece interface with a closing motion; and, separately from closing the workpiece interface, to controllably vibrate the workpiece interface by alternately causing an opening motion and a closing motion without clamping the workpiece into the workpiece interface.

P14. The workholder of any of P12-P13, wherein the set of actuators includes:
a workholder actuator operably coupled to the workpiece interface to controllably close the workpiece interface; and
a vibration actuator operably coupled to the workholder to controllably vibrate the workpiece interface independent of closing the workpiece interface. the workholder actuator is a distinct actuator from the vibration actuator and the workholder actuator is controllably operable to close the workpiece interface independently of control of the vibration actuator to vibrate the workpiece interface.

P15. The workholder of any of P12-P14, wherein the workpiece interface comprises:
a substrate defining a substrate plane; and
a set of tapered guides, each tapered guide of the set of tapered guides having a surface extending away from the substrate plane, and disposed and configured to guide the workpiece onto the substrate in response to vibrating the workpiece interface.

P16. The workholder of P15, wherein the set of tapered guides includes a tapered post, the tapered post having an slide surface, the slide surface disposed relative to the substrate plane such that the slides surface intersects the substrate plane such that the slide surface and substrate plane form an obtuse angle, the slide surface disposed and configured to guide the workpiece onto the substrate in response to vibrating the workpiece interface.

P17. The workholder of P15, wherein the workpiece defines a workpiece aperture having an edge, and the tapered post is configured to pass through the workpiece aperture and the slide surface is disposed and configured to engage the edge to guide the workpiece onto the substrate in response to vibrating the workpiece interface.

P18. A workholder to receive and securely hold a workpiece, the workholder comprising:
means for receiving a workpiece and controllably closing to clamp the workpiece, said means being workpiece interface means;
means for controllably closing the workpiece interface means; and
means for controllably vibrating the workpiece interface means to settle the workpiece into the workpiece interface means prior to closing to clamp the workpiece.

P19. The workholder of P18, wherein the means for controllably closing the workpiece interface means is distinct from, and is controllable independently of, the means for controllably vibrating the workpiece interface means.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A method of operating a workholder having a workpiece interface configured to controllably clamp a workpiece, the method comprising:
placing the workpiece into the workpiece interface, the workpiece interface being open to receive the workpiece;
prior to closing the workpiece interface, and separate from closing the workpiece interface, vibrating the workpiece interface to settle the workpiece into the workpiece interface; and subsequent to vibrating the workpiece interface
closing the workpiece interface to secure the workpiece to the workholder.

2. The method of claim 1, further comprising delivering, by a robot, the workpiece proximate to the workpiece interface, and pausing for a pre-established amount of time prior to placing the workpiece into the workpiece interface.

3. The method of claim 1, wherein:
the workholder comprises a workholder actuator operably coupled to the workpiece interface to controllably close the workpiece interface, and
vibrating the workpiece interface comprises operating the workholder actuator without closing the workpiece interface.

4. The method of claim 1, wherein:
the workholder comprises a workholder actuator operably coupled to the workpiece interface to controllably open the workpiece interface with an opening motion, and to controllably close the workpiece interface with a closing motion, and
vibrating the workpiece interface to settle the workpiece into the workpiece interface comprises alternating the workholder actuator between an opening motion and a closing motion.

5. The method of claim 1, wherein the workholder comprises a vibration actuator in addition to the workholder actuator, and
vibrating the workpiece interface comprises operating the vibration actuator without closing the workpiece interface; and
closing the workpiece interface comprises operating workholder actuator separately from operating the vibration actuator.

6. The method of claim 1, wherein the workpiece interface comprises a substrate defining a substrate plane and a set of guides, each guide of the set of guides having a surface extending away from the substrate plane, and disposed and configured to guide the workpiece onto the substrate in response to vibrating the workpiece interface.

7. The method of claim 6, wherein the set of guides includes a tapered post, the tapered post having a slide surface angled to intersect the substrate plane at an intersection such that the slide surface and the substrate plane form an obtuse angle at said intersection, the slide surface disposed and configured to guide the workpiece onto the substrate in response to vibrating the workpiece interface.

8. The method of claim 7, wherein the workpiece defines a workpiece aperture having an edge, and the tapered post is configured to pass through the workpiece aperture and the slide surface is disposed and configured to engage the edge to guide the workpiece onto the substrate in response to vibrating the workpiece interface.

9. The method of claim 6, wherein the set of guides includes a corner guide having two surfaces, the two surfaces extending away from the substrate plane, the two surfaces disposed at an angle to one another, so as to guide the workpiece onto the substrate in two corresponding directions in response to vibrating the workpiece interface.

10. The method of claim 6, wherein the set of guides includes a pair of corner guides, each corner guide of the pair of corner guides having two tapered surfaces, the two tapered surfaces disposed at an angle to one another, so as to guide the workpiece onto the substrate in two corresponding directions in response to vibrating the workpiece interface, wherein the pair of corner guides cooperate, in response to vibrating the workpiece interface, to automatically center the workpiece in at least one axis on the substrate plane.

11. The method of claim 1, wherein the workpiece interface comprises a substrate defining a substrate plane, and having a set of end stops, each end stop of the set of end stops having a set of end stop faces extending in a direction away from the substrate plane, each end stop of the set of end stops disposed and configured to constrain the workpiece while the workpiece is clamped by the workpiece interface.

12. A workholder to receive and securely hold a workpiece, the workholder comprising:
a base;
a workpiece interface coupled to the base, the workpiece interface configured to open into an open configuration to receive a workpiece, and configured to close into a closed configuration to secure the workpiece; and
a set of actuators, at least one actuator of the set of actuators operably coupled to the workpiece interface to controllably close the workpiece interface; and
at least one actuator of the set of actuators operably coupled to the workholder to controllably vibrate the workpiece interface independent of an act of closing the workpiece interface.

13. The workholder of claim 12, wherein the set of actuators includes a workholder actuator, said workholder actuator is operably coupled to the workpiece interface and configured:
to controllably open the workpiece interface with an opening motion, and to controllably close the workpiece interface with a closing motion; and, separately from closing the workpiece interface,
to controllably vibrate the workpiece interface by alternately causing an opening motion and a closing motion without clamping the workpiece into the workpiece interface.

14. The workholder of claim 12, wherein the set of actuators includes:
a workholder actuator operably coupled to the workpiece interface to controllably close the workpiece interface; and
a vibration actuator operably coupled to the workholder to controllably vibrate the workpiece interface independent of closing the workpiece interface, the workholder actuator is a distinct actuator from the vibration actuator and the workholder actuator is controllably operable to close the workpiece interface independently of control of the vibration actuator to vibrate the workpiece interface.

15. The workholder of claim 12, wherein the workpiece interface comprises:
a substrate defining a substrate plane; and
a set of tapered guides, each tapered guide of the set of tapered guides having a surface extending away from the substrate plane, and disposed and configured to guide the workpiece onto the substrate in response to vibrating the workpiece interface.

16. The workholder of claim 15, wherein the set of tapered guides includes a tapered post, the tapered post having a slide surface, the slide surface disposed relative to the substrate plane such that a plane of the slide surface intersects the substrate plane at an obtuse angle, the slide surface disposed and configured to guide the workpiece onto the substrate in response to vibrating the workpiece interface.

17. The workholder of claim 15, wherein the workpiece defines a workpiece aperture having an edge, and the tapered post is configured to pass through the workpiece aperture and the slide surface is disposed and configured to engage the edge to guide the workpiece onto the substrate in response to vibrating the workpiece interface.

18. A workholder to receive and securely hold a workpiece, the workholder comprising:

means for receiving a workpiece and controllably closing to clamp the workpiece, said means being workpiece interface means;

means for controllably closing the workpiece interface means; and means for controllably vibrating the workpiece interface means to settle the workpiece into the workpiece interface means prior to closing to clamp the workpiece.

19. The workholder of claim 18, wherein:

the means for controllably closing the workpiece interface means is configured to close the workpiece interface means by causing the workpiece interface means to execute a closing motion, and is also configured to alternately open the workpiece interface means by causing the workpiece interface means to execute an opening motion, such that said means is a means for controllably opening and closing the workpiece interface means; and the workholder further comprises control means to controllably vibrate the workpiece interface means to settle the workpiece into the workpiece interface means by causing the means for controllably opening and closing the workpiece interface means to execute, alternately, a plurality of opening motions and closing motions, without replacing the workpiece between said opening motions and closing motions, and prior to closing the workpiece interface means to secure the workpiece.

20. The workholder of claim 18, wherein the means for controllably closing the workpiece interface means is distinct from, and is controllable independently of, the means for controllably vibrating the workpiece interface means.

* * * * *